United States Patent
Miyoshi et al.

(10) Patent No.: US 10,759,673 B2
(45) Date of Patent: Sep. 1, 2020

(54) LITHIUM TITANATE POWDER INCLUDING PHOSPHOROUS, ACTIVE MATERIAL, ELECTRODE SHEET, AND ENERGY STORAGE DEVICE USING THE SAME

(71) Applicant: UBE INDUSTRIES, LTD., Ube-shi (JP)

(72) Inventors: Kazuhiro Miyoshi, Ube (JP); Hirofumi Takemoto, Ube (JP); Hiroshi Fujino, Ube (JP)

(73) Assignee: UBE INDUSTRIES, LTD., Ube-shi (JP)

( * ) Notice: Subject to any disclaimer, the term of this patent is extended or adjusted under 35 U.S.C. 154(b) by 186 days.

(21) Appl. No.: 15/555,348

(22) PCT Filed: Mar. 3, 2016

(86) PCT No.: PCT/JP2016/056612
§ 371 (c)(1),
(2) Date: Sep. 1, 2017

(87) PCT Pub. No.: WO2016/140312
PCT Pub. Date: Sep. 9, 2016

(65) Prior Publication Data
US 2018/0037467 A1    Feb. 8, 2018

(30) Foreign Application Priority Data

Mar. 4, 2015   (JP) ................................. 2015-042840

(51) Int. Cl.
*C01G 23/00* (2006.01)
*H01M 4/485* (2010.01)
(Continued)

(52) U.S. Cl.
CPC ........... *C01G 23/005* (2013.01); *C01G 23/00* (2013.01); *H01G 11/04* (2013.01); *H01G 11/06* (2013.01);
(Continued)

(58) Field of Classification Search
CPC ...... H01M 4/131; H01M 4/485; H01G 11/04; H01G 11/06; H01G 11/46; H01G 11/62; C01G 23/005; C01G 23/00
(Continued)

(56) References Cited

U.S. PATENT DOCUMENTS

2004/0202919 A1* 10/2004 Mardilovich ....... H01M 4/8621
                                                        429/488
2005/0238948 A1* 10/2005 Mei .................... H01M 4/8605
                                                        429/483
(Continued)

FOREIGN PATENT DOCUMENTS

EP    2 626 945 A1    8/2013
JP    2002274849 A *  9/2002
(Continued)

OTHER PUBLICATIONS

Natarajan et al., Focus on Spinel Li4Ti5O12 as Insertion Type Anode for High-Performance Na-Ion Batteries, 2019, Small, 15, 1904484 (Year: 219).*
(Continued)

*Primary Examiner* — Sean P Cullen
(74) *Attorney, Agent, or Firm* — Oblon, McClelland, Maier & Neustadt, L.L.P.

(57) ABSTRACT

Provided is a lithium titanate powder for an electrode of an energy storage device, wherein the lithium titanate powder includes $Li_4Ti_5O_{12}$ as a main component and has a specific surface area of 5 to 50 m$^2$/g, a total-fine pore volume of the lithium titanate powder is 0.03 to 0.5 ml/g and the lithium
(Continued)

titanate powder includes a phosphorus atom in an amount of 0.03 to 1% by mass, an active material containing the lithium titanate powder, an electrode sheet containing the active material, and an energy storage device using the electrode sheet.

16 Claims, 1 Drawing Sheet

(51) Int. Cl.
      *H01G 11/46*       (2013.01)
      *H01G 11/06*       (2013.01)
      *H01M 4/131*      (2010.01)
      *H01G 11/04*       (2013.01)
      *H01G 11/62*       (2013.01)
      *H01M 10/0525*    (2010.01)
      *H01M 10/0568*    (2010.01)
      *H01M 10/0569*    (2010.01)
      *H01M 4/02*       (2006.01)
      *H01M 10/0567*    (2010.01)

(52) U.S. Cl.
    CPC ............ *H01G 11/46* (2013.01); *H01G 11/62* (2013.01); *H01M 4/131* (2013.01); *H01M 4/485* (2013.01); *C01P 2002/54* (2013.01); *C01P 2006/12* (2013.01); *C01P 2006/14* (2013.01); *C01P 2006/40* (2013.01); *H01M 10/0525* (2013.01); *H01M 10/0567* (2013.01); *H01M 10/0568* (2013.01); *H01M 10/0569* (2013.01); *H01M 2004/021* (2013.01); *H01M 2300/0037* (2013.01); *H01M 2300/0042* (2013.01)

(58) Field of Classification Search
    USPC ...................................................... 429/231.5
    See application file for complete search history.

(56) References Cited

U.S. PATENT DOCUMENTS

| | | | |
|---|---|---|---|
| 2007/0009798 A1* | 1/2007 | Inagaki | C01G 23/005 429/231.1 |
| 2007/0117015 A1* | 5/2007 | Yamamoto | H01M 4/133 429/231.8 |
| 2008/0113264 A1* | 5/2008 | Inagaki | H01M 4/485 429/156 |
| 2008/0166637 A1 | 7/2008 | Inagaki et al. | |
| 2009/0042095 A1* | 2/2009 | Inagaki | C01G 23/005 429/92 |
| 2009/0293947 A1* | 12/2009 | Higuchi | H01G 9/2031 136/256 |
| 2011/0014543 A1* | 1/2011 | Taniguchi | H01M 4/8605 429/483 |
| 2012/0021292 A1 | 1/2012 | Awano et al. | |
| 2012/0027929 A1 | 2/2012 | Huang et al. | |
| 2012/0028113 A1 | 2/2012 | Huang et al. | |
| 2012/0028114 A1 | 2/2012 | Huang et al. | |
| 2012/0028115 A1 | 2/2012 | Huang et al. | |
| 2012/0028118 A1 | 2/2012 | Huang et al. | |
| 2012/0028119 A1 | 2/2012 | Huang et al. | |
| 2012/0028120 A1 | 2/2012 | Huang et al. | |
| 2012/0129016 A1* | 5/2012 | Inagaki | H01M 4/485 429/7 |
| 2012/0153225 A1* | 6/2012 | Ko | C01G 23/005 252/301.4 P |
| 2012/0168696 A1 | 7/2012 | Huang et al. | |
| 2012/0171570 A1 | 7/2012 | Huang et al. | |
| 2012/0244439 A1* | 9/2012 | Yu | H01M 4/131 429/217 |
| 2013/0095387 A1 | 4/2013 | Kawamura et al. | |
| 2013/0202968 A1 | 8/2013 | Song et al. | |
| 2013/0244114 A1* | 9/2013 | Yamamoto | H01M 4/485 252/520.21 |
| 2014/0030610 A1* | 1/2014 | Abe | H01G 11/58 429/330 |
| 2014/0057173 A1* | 2/2014 | Jeong | H01M 4/366 429/219 |
| 2016/0204433 A1 | 7/2016 | Takemoto et al. | |
| 2016/0293978 A1* | 10/2016 | Krishnan | C25B 15/08 |
| 2017/0040602 A1* | 2/2017 | Ha | H01M 4/366 |
| 2017/0107117 A1 | 4/2017 | Takemoto et al. | |
| 2019/0085470 A1* | 3/2019 | Ono | C25B 1/06 |
| 2019/0198891 A1* | 6/2019 | Takata | H01M 8/0215 |

FOREIGN PATENT DOCUMENTS

| | | | |
|---|---|---|---|
| JP | 2006-59960 | A | 3/2006 |
| JP | 4558229 | B2 | 10/2010 |
| JP | 2011-165372 | A | 8/2011 |
| JP | 2012-28026 | A | 2/2012 |
| JP | 2012-33483 | A | 2/2012 |
| JP | 2012-109279 | A | 6/2012 |
| JP | 2013-41844 | A | 2/2013 |
| JP | 2013-84517 | A | 5/2013 |
| JP | 2013-177310 | A | 9/2013 |
| JP | 2014-24723 | A | 2/2014 |
| JP | 2014-86164 | A | 5/2014 |
| JP | 2014086164 | A * | 5/2014 |
| JP | 5529824 | B2 | 6/2014 |
| JP | 2014-143004 | A | 8/2014 |
| JP | 5690029 | B1 | 3/2015 |

OTHER PUBLICATIONS

Extended European Search Report dated Jul. 18, 2018 in European Patent Application No. 16759004.1, 7 pages.
International Search Report dated May 31, 2016, in PCT/JP2016/056612, filed Mar. 3, 2016.
Office Action dated Apr. 28, 2015, in Japanese Patent Application No. 2015-042840, filed on Mar. 4, 2016 (with English translation).
Office Action dated Jul. 14, 2015, in Japanese Patent Application No. 2015-042840, filed on Mar. 4, 2016 (with English translation).

* cited by examiner

LITHIUM TITANATE POWDER INCLUDING PHOSPHOROUS, ACTIVE MATERIAL, ELECTRODE SHEET, AND ENERGY STORAGE DEVICE USING THE SAME

TECHNICAL FIELD

The present invention relates to a lithium titanate powder suitable such as for an electrode material of an energy storage device, an active material using the lithium titanate powder, and an energy storage device using the active material to a positive electrode sheet or negative electrode sheet.

BACKGROUND ART

Recently, various types of materials have been studied as electrode material for energy storage devices. Among them, lithium titanate is attracting attention for use as an active material of an energy storage device for electric vehicles such as HEV, PHEV, and BEV for its superior input-output performance when used as an active material.

However, particularly when used for an HEV, since energy discharged during slowdown of an electric vehicle is recovered (called "regeneration") and extremely large current instantaneously flows to an energy storage device, further improvement in quick charge characteristics is desired. Further, since vehicles are used for more than ten years, it is also desired that the energy storage device for an electric vehicle maintains its performance that does not deteriorate over a long period of time.

Patent Document 1 discloses that by making an average pore diameter of lithium titanate within a range of 50 to 500 Å and making fine pore volume 0.01 ml/g or more, charge discharge rate performance and cycle characteristics become better.

Patent Document 2 discloses that, by including 0.10 to 0.25% by mass of $K_2O$ and 0.10 to 0.50% by mass of $P_2O_5$, an initial discharge capacity of lithium titanate becomes larger. When doing this, in order to adjust $K_2O$ and $P_2O_5$ contents in lithium titanate, specific amounts of $K_2O$ and $P_2O_5$ are included in raw material of titanium oxide, such titanium oxide and lithium hydroxide are mixed so as to make an atomic ratio of Li to Ti 4:5, and calcined at 875° C. or 800° C. in the air for 6 hours to prepare lithium titanate. More, in Patent Document 2, titanium oxide as raw material is prepared by adding predetermined contents of $K_2O$ and $P_2O_5$ to hydrous titanium oxide, calcining, and milling the same. That is, in Patent Document 2, $P_2O_5$ is used as the raw material to introduce P atoms.

Patent Document 3 discloses that, by allowing coexistence of Nb, K and P in lithium titanate, solubility of Nb accelerates and at the same time, necking between particles is suppressed by an effect of Nb addition, as a result, particle growth in lithium titanate is suppressed, so as that aggregation hardly occurs, and thus lithium titanate having better charge/discharge rate performance can be obtained. In the case, the raw material used to adjust concentration of P atoms is ammonium dihydrogen phosphate, and lithium titanate is prepared by mixing lithium carbonate and titanium oxide so as to make a molar ratio of Li:Ti in the product obtained after calcination 4:5 (also, a predetermined amount of potassium hydroxide and niobium oxide are mixed), calcining the same at 820° C. or 850° C. for three hours in the air. In Patent Document 3, P content in lithium titanate is 0.013 to 0.240% by mass.

RELATED DOCUMENT

Patent Document

Patent Document 1: JP2012-109279A
Patent Document 2: JP4558229A
Patent Document 3: JP5529824A

SUMMARY OF INVENTION

Problems to be Solved by Invention

Like in Patent Document 1, when fine pore volume is raised, although rate performance become better, but there is a problem that capacity retention ratio after high-temperature storage lowers. Also, in Patent Document 2 and Patent Document 3, improvement of initial discharge capacity and charge/discharge rate performance is attempted by including a predetermined amount of phosphorus (P) atoms in lithium titanate. However, lithium titanate obtained in Patent Document 2 and Patent Document 3 had small fine pore volume and charge characteristics at an extremely high rate of 50 C is totally unsatisfactory.

An objective of the present invention is to provide a lithium titanate powder that exhibits a large initial charge-discharge capacity, superior charge rate performance, and high capacity retention ratio after high-temperature storage when applied to an energy storage device as electrode material, an active material including the lithium titanate powder, and an energy storage device using the active material.

Means for Solving Problems

The present inventors have studied intensively to achieve the above-mentioned objective, and finally have found, as titanate, a lithium titanate powder where a predetermined amount of phosphorus atoms is included, specific surface area is within a predetermined range, and fine pore volume is a preterminal value. More, the present inventors have also found that in an energy storage device to which such a lithium titanate powder is applied, as active material, an initial charge-discharge capacity is large, charge rate performance is excellent, and a capacity retention ratio after high-temperature storage is high. Accordingly, the present invention relates to the following items.

(1) A lithium titanate powder for an electrode of an energy storage device, wherein the lithium titanate powder includes $Li_4Ti_5O_{12}$ as a main component and has a specific surface area of 5 to 50 m²/g, a total-fine pore volume of the lithium titanate powder is 0.03 to 0.5 ml/g and the lithium titanate powder includes a phosphorus atom in an amount of 0.03 to 1% by mass.

(2) The lithium titanate powder for an electrode of an energy storage device according to (1) above, wherein a phosphorus atom content is 0.03 to 0.8% by mass.

The lithium titanate powder for an electrode of an energy storage device according to (1) above, wherein a phosphorus atom content is 0.25 to 0.8% by mass.

(4) The titanate powder for an electrode of an energy storage device according to any one of (1) to (3) above, wherein when a volume surface diameter calculated from a specific surface area determined by the BET method is represented as $D_{BET}$, and when a crystallite diameter calculated from a half-peak width of the peak for the (111) plane of $Li_4Ti_5O_{12}$ by the Scherrer equation is represented as $D_X$, $D_{BET}/D_X$ (μm/μm), a ration of $D_{BET}$ to $D_X$, is 3 or less.

(5) The lithium titanate powder for an electrode of an energy storage device according to (4) above, wherein $D_{BET}/D_X$ (μm/μm) is less.

(6) The lithium titanate powder for an, electrode of an energy storage device according to any one of (1) to (5) above, wherein Li/Ti, an atomic ration of Li to Ti, is 0.80 or more and 0.89 or less.

(7) An active material including the lithium titanate powder for an electrode of an energy storage device according to any one of (1) to (6) above.

(8) An electrode sheet for an energy storage device including the active material according to (7) above.

(9) An energy storage device including the electrode sheet according to (8) above.

(10) A lithium-ion secondary battery including the active material according to (7) above.

A hybrid capacitor including the active material according to (7) above.

(12) The energy storage device according to (9) above, wherein a non-aqueous electrolyte solution where electrolyte salt including at least one kind of lithium salt selected from $LiPF_6$, $LiBF_4$, $LiPO_2F_2$, and $LiN(SO_2F)_2$ is dissolved to a nonaqueous solvent including one kind or more cyclic carbonates selected from ethylene carbonate, propylene carbonate, 1,2-butylene carbonate, 2,3-butylene carbonate, 4-fluoro-1,3-dioxolane-2-one, and 4-ethynyl-1,3-dioxolane-2-one is used.

(13) The energy storage device according to (12) above, wherein the non-aqueous electrolyte solution has a concentration of all electrolyte salts of 0.7M or more and 2.0M or less, includes at least $LiPF_6$ as electrolyte salt, and further includes at least one kind of lithium salt selected from $LiBF_4$, $LiPO_2F_2$, and $LiN(SO_2F)_2$ within a range of 0.01M or more and 0.4M or less.

(14) The energy storage device according to (12) or (13) above, wherein the nonaqueous solvent further includes one or more kinds of symmetrically chain carbonates selected from dimethyl carbonate, diethyl carbonate, dipropyl carbonate, and dibutyl carbonate, and one or more kinds of asymmetrically chain carbonates selected from methyl ethyl carbonate, methyl propyl carbonate, methyl isopropyl carbonate, methyl butyl carbonate, and ethyl propyl carbonate.

Effect of Invention

According to the present invention, lithium titanate powder suitable for use as electrode material for energy storage devices having large initial charge-discharge capacity, excellent charge rate performance, and high capacity retention ratio alter high-temperature storage, an active, material, and an energy storage device are provided.

MODES FOR CARRYING OUT INVENTION

Figure 1:
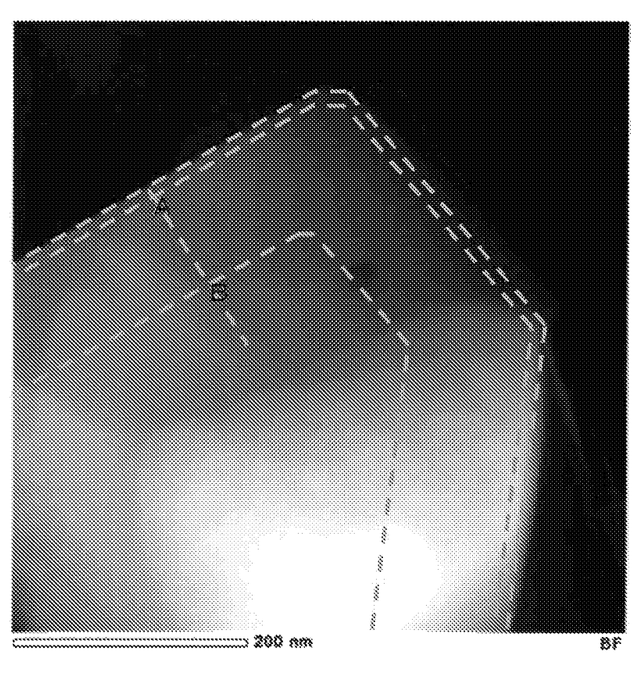
The FIGURE is a scanning transmission electron microscopic image of a cross-section of a lithium titanate particle constituting the lithium titanate powder according to Example 3 (×200,000).

[Lithium Titanate Powder of the Present Invention]

A lithium titanate powder of the present invention is the lithium titanate powder which includes $Li_4Ti_5O_{12}$ as a main component and has a specific surface area of 5 to 50 m²/g, a total-fine pore volume of the lithium titanate powder is 0.03 to 0.5 ml/g and the lithium titanate powder includes a phosphorus atom in an amount of 0.03 to 1% by mass.

Here, including $Li_4Ti_5O_{12}$ as a main component means that, when peak intensity that corresponds to the main peak of $Li_4Ti_5O_{12}$ among the peaks measured by the X-ray diffraction analysis is defined to be 100, the main peak intensity of anatase-type titanium dioxide is 5 or less, and the peak intensity of the peak of a diffraction angle (2θ) =43.5 to 43.8° is 5 or less. However, since 50 C charge rage characteristics of the energy storage device tend to improve and initial discharge capacity tends to become large when amounts of such components other than $Li_4Ti_5O_{12}$ are small, it is preferable that amounts of the components other than $Li_4Ti_5O_{12}$ are kept small. Particularly, since 50 C charge rate performance tends to improve and the initial discharge capacity tends to become large when the amount of $Li_2TiO_3$ is small, among the peaks that derive from $Li_2TiO_3$ measured by the X-ray diffraction analysis, the peak intensity of the peak of the diffraction angle (2θ)=43.5 to 43.8° is preferably 3 or less and particularly preferably 1 or less.

For the lithium titanate powder of the present invention, Li/Ti, atomic ratio of Li to Ti is preferably 0.79 to 0.90. When the atomic ratio is within this range, the ratio of $Li_4Ti_5O_{12}$ in the lithium titanate powder increases and the initial charge-discharge capacity of an energy storage device where the lithium titanate powder of the present invention is applied as electrode material increases. From this point of view, the atomic ratio Li/Ti is more preferably 0.80 or more, further preferably 0.82 or more, and particularly preferably 0.83 or more. Further, 0.89 or less is more preferable and 0.88 or less is further more preferable.

<Total Fine-Pore Volume>

The total fine-pore volume of the lithium titanate powder of the present invention is 0.03 to 0.5 ml/g. When the total fine-pore volume is within the range, an energy storage device having a large charge-discharge capacity, excellent 50 C charge rate performance, and high capacity retention ratio after high-temperature storage can be obtained by applying the lithium titanate powder to the energy storage device. From the viewpoint of further improving 50 C charge rate performance, the total fine-pore volume is preferably 0.1 ml/g or more, more preferably 0.15 ml/g or more, and particularly preferably 0.2 mug or more. More, from the viewpoint of further improving capacity retention ratio after high-temperature storage of the energy storage device, the total fine-pore volume is preferably 0.45 ml/g or less, more preferably 0.4 ml/g or less, and particularly preferably 0.35 ml/g or less. Additionally, the total fine-pore volume of the lithium titanate powder of the present invention is the total fine-pore volume measured by a gas absorption method.

<Phosphorus Atom (P) Content>

The phosphorus atom (P) content of the lithium titanate powder of the present invention is 0.03 to 1% by mass. When the phosphorus atom (P) content is within the range, an energy storage device with a large charge-discharge capacity, excellent 50 C charge rate performance, and high capacity retention ratio after high-temperature storage can be obtained by applying the lithium titanate powder to the energy storage device. From the viewpoint of raising the capacity retention ratio after high-temperature storage of the energy storage device, the phosphorus atom content is preferably 0.25% by mass or more and more preferably 0.4% by mass or, more. Further, from the viewpoint of increasing the initial discharge capacity, the phosphorus atom content is preferably 0.8% by mass or less and more preferably 0.6% by mass or less. More specifically, from the viewpoint of further increasing charge-discharge capacity, the phosphorus atom (P) content is preferably 0.03 to 0.8% by mass, and from the viewpoint of further increasing the charge-discharge capacity and further raising the capacity retention ratio after high-temperature storage of the energy storage device, the phosphorus atom (P) content is more preferably 0.25 to 0.8% by mass. The lithium titanate powder for an electrode of an energy storage device of the present invention preferably contains lithium atoms with phosphorus atoms by three times the phosphorus atoms, in other words, preferably contains phosphorus atoms as $Li_3PO_4$ in oxide expression, and preferably contains $Li_3PO_4$ by 0.12 to 3.7% by mass. Further, 0.95 to 2.98% by mass is particularly preferable. Preferably, the phosphorus atoms are uniformly contained in entire particles. When measuring in [Method of measuring physical properties]. [7. Concentration of titanium atoms (Ti) and, phosphorus atoms (P) at cross-section of lithium titanate particle (scanning transmission electron microscope (STEM))] described in the following, in the cross-sectional analysis of a lithium titanate particle using a scanning transmission electron microscope, when expressing atomic concentrations of titanium atoms and phosphorus atoms measured by energy dispersive X-ray spectroscopy, from the average of 10 points positioned on a 5-nm-shift line (a line positioned 5 nm inside from the outline, which is the outline of the titanate particle surface, and following a similar path traced by the outline) indicating a line showing positions shifted 5 am inside from the outline of lithium titanate particle surface, as Ati (atm %) and Ap (atm %) respectively, and when expressing atomic concentrations of titanium and phosphorus atoms measured from the average of 10 points positioned on a 100-nm-shift line (a line positioned 100 nm inside from the outline and following a similar path traced by the outline) indicating a line showing positions shifted 100 nm inside from the surface of the lithium titanate particle, as Bti (atm %) and Bp (atm %), preferably, the following formula (1) is satisfied, more preferably the following formula (2) is satisfied, and particularly preferably the following formula (3) is satisfied.

$$0.5 \le (Ap/Ati)/(Bp/Bti) \le 2 \quad (1)$$

$$0.6 \le (Ap/Ati)/(Bp/Bti) \le 1.5 \quad (2)$$

$$0.8 \le (Ap/Ati)/(Bp/Bti) \le 1.2 \quad (3)$$

When the total fine-pore volume of the lithium titanate powder used as electrode material is increased, contact area between the lithium titanate particle and electrolytic solution increases, and thus the energy storage device to which the lithium titanate powder is applied can be charged more quickly. On the other hand, the capacity retention ratio after high-temperature storage of the energy storage device decreases. For this reason, by adding a certain amount of phosphorus atoms to lithium titanate, the capacity retention ratio of the energy storage device with lithium titanate can be improved. Though it is only an assumption, probably phosphorus atoms taken inside the lithium titanate particle become as ( ... Li—O—P—O—Ti—O— ... ) and they act as a trap site of lithium ions inside lithium titanate crystals during high-temperature storage of the energy storage device.

<$D_X$>

In the present invention, a crystallite diameter calculated from a half-peak width of the (111) plane of $Li_4Ti_5O_{12}$ by the Scherrer equation is represented as $D_X$. The measurement method for $D_X$ is explained in [2. Crystallite diameter ($D_X$)] in [Method of measuring physical properties] in the following. From, a viewpoint of improving 50 C charge rate performance of the energy storage device, $D_X$ is preferably 100 nm or less and more preferably 80 nm or less. From a viewpoint of raising capacity retention ratio after high-temperature storage, preferably, $D_X$ is 15 nm or more.

<$D_{BET}$>

A volume surface diameter of the lithium-titanate powder of the present invention calculated from a specific surface area determined by the BET method is represented as $D_{BET}$. A measurement method for $D_{BET}$ is explained in [5. BET diameter ($D_{BET}$)] in [Method of measuring physical properties] in the following. From a viewpoint of improving 50 C charge rate performance of the energy storage device, $D_{BET}$ is preferably 0.1 μm or less and more preferably 0.08 μm or less. From a viewpoint of raising capacity retention ratio after high-temperature storage, preferably, $D_{BET}$ is 0.03 μm or more.

<$D_{BET}/D_X$>

When a volume surface diameter calculated from a specific surface area determined by the BET method of the lithium titanate powder of the present invention is $D_{BET}$ and a crystallite diameter calculated from the half-peak width of the (111) plane of $Li_4Ti_5O_{12}$ by the Scherrer equation is $D_X$, from a viewpoint of improving 50 C charge rate performance, a ratio of $D_{BET}$ to $D_X$, $D_{BET}/D_X$, is preferably 3 or less and more preferably 2 or less, and further preferably 1.5 or less.

<Volume-Median Particle Diameter>

The lithium titanate powder of the present invention can be either powder obtained without granulation operation or powder obtained by performing granulation operation before or after calcination. If it is a powder obtained without granulation operation, the volume-median particle diameter (or average particle size, hereafter indicated as $D_{50}$) of the lithium titanate powder of the present invention is 0.01 to 2 μm. In order to suppress aggregation of the lithium titanate powder and to improve its handling when preparation of an electrode, $D_{50}$ of the lithium titanate powder of the present invention obtained without granulation is preferably 0.1 μm or more, and preferably 1 μm or less to improve 50 C charge rage characteristics of the energy storage device. From these points, $D_{50}$ of the lithium titanate powder of the present invention obtained without granulation operation is more preferably 0.1 to 1 μm, and further preferably 0.2 to 0.9 μm. On the other hand, if it is the powder obtained by performing granulation operation, $D_{50}$ of the lithium titanate powder in the present invention is preferably 50 μm or less. Here, $D_{50}$ indicates a particle diameter where a volume cumulative frequency calculated in volume fraction becomes 50% when integrated from smaller particles. Its measurement method is explained later in [3. Particle size distribution] in [Method of measuring physical properties].

[Manufacture Method of Lithium Titanate Powder of the Present Invention]

As far as raw material containing a phosphorus atom (P) is used in order to include a certain amount of phosphorus atom (P) in an obtained product and mixing method of the raw material and its conditions, calcination conditions, conditions of deagglomeration, milling, classification, magnetic separation, etc. can be adjusted so as to make the specific surface area and total fine-pore volume become within a certain range, there are no particular restrictions to the manufacture method. However, as for the preparation method of the lithium titanate powder of the present invention, it is preferably a method including a process of milling and mixing the raw material to a certain state, a process of calcining at high temperature for a short time (short-time high-temperature), and a postprocessing process of deagglomeration, milling, classification, and magnetic separation.

When calcination time is long, loss of fine pores on the particle surface and fusion between particles occur, and total fine-pre volume of the lithium titanate powder after calcination becomes very small. Accordingly, in this case, to obtain lithium titanate powder of the present invention, milling is required after calcination. However, by performing calcination at high temperature for a short time (short-time high temperature) after milling and mixing raw materials to a certain state until the raw materials become a state where they can easily react with each other, the lithium titanate powder of the present invention can be obtained without performing milling after calcination. The lithium titanate powder of the present invention obtained by such method is preferable since it has small $D_{BET}/D_X$ and the effect of invention becomes more apparent.

In the following, an example of the manufacture method of the lithium titanate powder of the present invention is explained, separately by a raw material preparation process, calcination process, and postprocessing process such as deagglomeration, classification, and magnetic separation. However, manufacturing method of the lithium titanate powder of the present invention is not limited thereto.

<Raw Material Preparation Process>

Raw materials of the titanate powder of the present invention include titanium raw material, lithium raw material, and phosphorus additive. As the titanium raw material, titanium compounds such as anatase-type titanium dioxide and rutile-type titanium dioxide are used. It is preferable that they easily react with lithium raw material in a short time, and from such viewpoint, anatase-type titanium dioxide is preferable. As to the volume-median particle diameter of the titanium raw material (average particle size, $D_{50}$), 2 μm or less is preferable in order to ensure sufficient reaction of raw materials in a short time calcination.

As for the lithium raw material, lithium compounds such as lithium hydroxide monohydrate, lithium oxide, lithium hydrogencarbonate, and lithium carbonate may be used. In the perspective of calcining at a high temperature, a lithium compound with higher melting point is preferable, and lithium carbonate is particularly preferable.

As phosphorus additive, use of a compound of phosphorus containing lithium atom is preferable, and particularly, use of $Li_3PO_4$ (melting point; 837° C.) is preferable. When a phosphorus additive without lithium atom such as $P_2O_5$ (melting, point; 340° C.) or $NH_4H_2PO_4$ (melting point; 190° C.) is used as the phosphorus additive, because their melting points are low, reaction with titanium raw material starts from relatively low temperature and crystal growth accelerates, and thus total pore volume and BET specific surface area tend to become small and 50 C charge rate performance lowers drastically. Also, since such phosphorus additives not containing lithium atom try to become a state close to $Li_3PO_4$ that is stable during calcination, reaction becomes ununiform due to shortage of Li and rutile-type impurities such as $TiO_2$ and $Li_2TiO_3$ are generated. When the percentage of such impurities become large, lowering of initial discharge capacity may occur. Instead of using the phosphorus additive not containing lithium atom alone, by using lithium raw material in the amount that corresponds to three times the mole number of the adding phosphorus atoms in addition separately from that for use in $Li_4Ti_5O_{12}$, and by reacting the lithium compound and phosphorus compound, $Li_3PO_4$ may be obtained during calcination. As the lithium compound, lithium compounds such as lithium hydroxide monohydrate, lithium oxide, lithium hydrogencarbonate, lithium carbonate, lithium nitrate, and lithium acetate are used. As the phosphorus compound, ammonium dihydrogen phosphate, ammonium metaphosphate, diammonium hydrogen phosphate, phosphoric acid, and phosphorus pentaoxide, etc., may be used. From the viewpoint of not easily allowing impurities to mix in, it is particularly preferable to use $Li_3PO_4$ as it is.

In the present invention, a mixture containing the above raw materials is preferably prepared in such a manner that D95 in a particle size distribution curve of the mixed powder constituting the mixture measured by a laser diffraction/scattering type particle size measuring device becomes 5 μm or less before calcination. From the viewpoint of increasing the total fine-pore volume, 1 μm or less is more preferable, 0.7 μm or less is further more preferable, and 0.5 μm or less is particularly preferable. Here, D95 means the particle diameter where volume cumulative frequency calculated in volume fraction becomes 95% when integrated from smaller particles. The mixture can be a mixed powder prepared as above, or a granulated powder obtained by granulation of the mixed powder prepared as above. Further, the mixture for calcination can be in a form of slurry including the mixed powder or granulated powder above. If the mixture is a granulated powder, D95 of the granulated powder does not need to be 5 μm or less but preferably the granulated powder obtained by granulating the mixed powder has D95 of 5 μm or less.

As for a preparation method of a mixture, the following methods can be adopted. The first method is that the compounded raw materials are mixed and milled simultaneously. The second method is that each raw material is milled until its D95 after mixing becomes 5 μm or less and then either simply mixed or mixed with light milling. The third method is that powder constituted by fine particles is first prepared by crystallizing the raw material or the like, classified as required, and then simply mixed or mixed with light milling. Among these methods, the first method where the raw materials are milled and mixed simultaneously is industrially beneficial as it has fewer processes. Further, a conductive agent may be added at the same time.

If the obtained mixture is a mixed powder, it can be used for the next calcination process as it is. If the obtained mixture is mixed slurry containing the mixed powder, then it can be used for the next calcination process after having granulated and dried with a spray dryer or the like. If a rotary kiln furnace is used for calcination, then the mixed slurry can be used as it is.

<Calcination Process>

Next, the mixture is subjected to calcination. In the perspective of making the total fine-pore volume of powder obtained by calcination larger and the crystallite diameter larger, preferably calcination is performed in a short-time high-temperature. From this viewpoint, the maximum temperature during calcination is 800 to 1,100° C., more preferably 800 to 1,000° C., and further preferably 800 to 900° C. Similarly, from the viewpoint above, a time for retaining the maximum temperature during calcination is preferably 2 to 90 minutes, more preferably 5 to 60 minutes, and further preferably 5 to 45 minutes. If the maximum temperature during calcination is high, a shorter retaining time is preferably selected. Likewise, from the viewpoint of making the total fine-pore volume of the powder obtained by the calcination larger and making the crystallite diameter larger, in a temperature raising process during calcination, making the length of time maintained within the 700 to 800° C. range particularly short, for example, 15 minutes or less, is preferable.

The calcination method is not particularly restricted, as long as it can be calcined in above conditions. As for the calcination method, a fixed-bed furnace, a roller-hearth kiln furnace, a mesh-belt kiln furnace, a fluidized-bed furnace, and a rotary kiln furnace can be used. However, to perform calcination efficiently in a short time, a roller-hearth kiln, a mesh-belt kiln, or a rotary kiln furnace is preferable. If a roller-hearth kiln or mesh-belt kiln in which a mixture is stored in a saggar for calcination is used, the amount of mixture contained in the saggar is preferably kept small in order to keep the lithium titanate quality stable, which is possible by keeping temperature distribution of the mixture uniform during calcination.

The rotary kiln furnace is particularly preferable for manufacturing lithium titanate powder of the present invention from the perspective of no need of containers for storing the mixture so that mixture can be added continuously, and uniform heat history to the calcined object so as to obtain homogenous lithium titanate powder.

There is no particular limitation to the calcination atmosphere an calcination furnaces as long as desorbed water and carbon dioxide can be eliminated from the atmosphere. Generally, an atmosphere with compressed air is used, however, oxygen, nitrogen, or hydrogen atmosphere, etc., may be used.

<Postprocessing Process>

To the lithium titanate powder after calcination obtained as above, although the total fine-pore volume can be adjusted by milling performed later has slight aggregation but does not require such milling to break particles, and only deagglomeration and classification that disentangle aggregation are applied as needed. When only slight deagglomeration is performed to disentangle aggregation without performing milling, small $D_{BET}/D_X$ of the lithium titanate powder after calcination can be retained, which is preferable.

A mixture according to the present invention is composed of a mixed powder where titanium raw material, lithium raw material, and phosphorus additive are mixed uniformly, and where amounts of relatively large particles are small is preferable. Specifically, the mixture is preferably composed of a mixed powder prepared to have D95 of 5 µm or less, or a granulated powder obtained by granulating the said mixed powder. If the mixture containing a mixed powder, where particle size distribution is not adjusted, is calcined at short-time high-temperature, lithium titanate powder having a large crystallite diameter can be obtained, however, the ratio of different phases such as $Li_2TiO_3$ and rutile-type titanium dioxide is increased. Thus, initial discharge capacity may decrease. Whereas, if calcination time is made longer, although the content of different phases decreases, a BET diameter becomes large.

The reason why lithium titanate powder with a small BET diameter compared to crystallite diameter can be obtained, which is preferable in the present invention, is speculated due to the following reasons.

A calcination temperature range of 700 to 800° C. is the range where crystal nucleuses of lithium titanate start to generate. It is speculated that making the length of time stayed within the temperature range short suppresses the number of crystal nucleuses generated and enhances independent growth of each crystal nucleus, thus leading to a larger crystallite diameter in the obtained lithium titanate powder. On the other hand, calcination is preferably performed in short time at a low temperature in order to obtain lithium titanate powder with a small BET diameter. However, under such calcination conditions, titanium raw material and lithium raw material do not react sufficiently and lead to form different phases such as rutile-type titanium dioxide. In the present invention, it is speculated that BET diameter of the obtained lithium titanate powder can be made small while suppressing generation of different phases by reacting a titanium raw material and lithium raw material sufficiently by: making a mixture for calcination to a condition such that titanium raw material and lithium raw material at most places in the mixture can react easily even in a short-time calcination in advance, that is, fewer large particles which may take time to react sufficiently to the inside, and uniform mixture even locally; more specifically, preparing a mixed powder such that D95 becomes 5 µm or less; and subjecting a mixture composed of the mixed powder or a granulated powder obtained by granulating the mixed powder to a short-time calcination at a high temperature of 800° C. or more.

[Active Material]

The active material of the present invention contains the above lithium titanate powder. It may contain one or more materials other than the lithium titanate powder. As for other materials, for example, carbon materials [pyrolytic carbons, cokes, graphite (such as artificial graphite and natural graphite), organic polymer compound burned materials, and carbon fibers], tin or tin compound, and silicon or silicon compound are used.

[Electrode Sheet]

An electrode sheet of the present invention is a sheet including a mixture layer containing an active material (an active material of the present invention), conductive agent and binder on one surface or both surfaces of the current collector, and the electrode sheet is cut in accordance with a design shape of the energy storage device and used as a positive electrode or negative electrode.

[Energy Storage Device]

The energy storage device of the present invention is a device for storing and releasing energy by utilizing intercalation and deintercalation of lithium ions to electrodes containing the active material, such as a hybrid capacitor, and lithium battery, etc.

[Hybrid Capacitor]

The hybrid capacitor is a device here an active material such as activated carbon that generates capacity by physical adsorption similar to that of electrode material in an electric double-layer capacitor, an active material such as graphite that generates capacity by physical adsorption and intercalation and deintercalation, and an active material such as a conductive polymer that generates capacity by redox are used for the positive electrode, and where the active material of the present invention is used for the negative electrode.

[Lithium Battery]

The lithium battery of the present invention includes both lithium primary battery and lithium secondary battery. Also, in this description, the term lithium secondary battery is used on the basis of the concept to include so-called lithium-ion secondary batteries.

The lithium battery consists of a positive electrode, a negative electrode, non-aqueous electrolyte where electrolyte salt is dissolved to a nonaqueous solvent, and so on, and the active material can be used as electrode material. The active material may be used as either a positive electrode active material or negative electrode active material. The following describes a case where the active material is used as the negative electrode active material.

<Negative Electrode>

A negative electrode contains a mixture layer including a negative electrode active material (the active material of the present invention), a conductive agent, and a binder on single or both sides of a negative electrode current collector.

There are no particular restrictions to the conductive agent for a negative electrode, as long as it is electron conductive material that does not generate chemical changes. For example, graphite such as natural graphite (e.g., scale-like graphite) and artificial graphite, and carbon blacks such as acetylene black, Ketjenblack, channel black, furnace black, lamp black, and thermal black, carbon nanotubes such as single layer carbon nanotube, multi-layered carbon nanotube (graphite layers in the form of multiple concentric cylinders) (non-fishbone shape), a cup layered type carbon nanotube (fish-bone shape (fishbone)) section-type carbon nanofiber (non-fishbone structure), and platelet-type carbon nanofiber (card-type) can be used. Also, graphites, carbon blacks, and carbon nanotubes may be mixed as required. Although there is no particular limitation, the specific surface area of carbon blacks is preferably 30 to 3,000 $m^2/g$ and more preferably 50 to 2,000 $m^2/g$. When the specific surface area is below 30 $m^2/g$, contact area with the active material becomes low and thus conductivity is avoided and internal resistance rises. When the specific surface area exceeds 3,000 $m^2/g$ the amount of solvent required for making coating material increases and improvement of electrode density becomes even difficult that is unsuitable for raising capacity of the mixture layer. Further, the specific surface area of graphites is preferably 30 to 600 $m^2/g$ and more preferably 50 to 500 $m^2/g$. When the specific surface area is below 30 $m^2/g$, contact area with the active material becomes low and thus conductivity is avoided and internal resistance rises. When the specific surface area exceeds 600 $m^2/g$, the amount of solvent required for making coating material increases and improvement of electrode density becomes even difficult that is unsuitable for raising capacity of the mixture layer. More, an aspect ratio of carbo nanotubes is 2 to 150 and preferably 2 to 50, more preferably 2 to 30, and further more preferably 2 to 20. When the aspect ratio is high, the structure of the formed fiber approaches a cylindrical tube shape and although conductivity in the fiber axis direction of a single fiber improves, frequency that the open ends of graphite mesh face constituting a structural unit body are exposed to the outer peripheral surface of the fiber becomes low, and thus conductivity between adjacent fibers decreases. On the other hand, when the aspect ratio is small, frequency of an open end oft graphite mesh face forming a structural unit body being exposed to the outer peripheral surface of the fiber becomes high, and thus conductivity between adjacent fibers improves. However, because the outer peripheral surface of the fiber is formed by many graphite mesh faces short in the fiber-axis direction by connection, conductivity of a single fiber in the fiber-axis direction is lost.

The amount of the conductive assistant to be added should be optimized since the addition amount varies according to the specific surface area of the active material, type and combinations of the conductive assistant, however, 0.1 to 10% by mass is preferable in the mixture layer, and 0.5 to 5% by mass is more preferable. When the addition amount is less than 0.1% by mass, conductivity of the mixture layer cannot be secured, and when it exceeds 10% by mass, because an active material ratio decreases and discharge capacity of the energy storage device per unit mass and unit volume of the mixture layer is reduced, it is unsuitable for increasing the capacity.

The binder for a negative electrode is, for example, polytetrafluoroethylene (PTFE), polyvinylidene fluoride (PVDF), polyvinylpyrrolidone (PVP), styrene butadiene copolymer (SBR), acrylonitrile butadiene copolymer (NBR), and carboxymethyl cellulose (CMC), etc. Although the molecular weight of polyvinylidene fluoride is not especially limited, it is preferably 20,000 to 200,000. From a viewpoint of securing biding property of the mixture layer, 25,000 or more is preferable, 30,000 or more is more preferable, and 50,000 or more is further more preferable. From a viewpoint of securing conductivity without disturbing contact between the active material and conductive agent, 150,000 or less is preferable. Particularly, when the specific surface area of the active material is 10 $m^2/g$ or more, the molecular weight is preferably 100,000 or more.

The amount of the binder to be added should be optimized in accordance with the specific surface area of the active material, type and combinations of the conductive assistant, however, addition amount is preferably 0.2 to 15% by mass in the mixture layer. From a viewpoint of securing strength of the mixture layer by increasing the binding property, 0.5% by mass or more is preferable, 1% by mass or more is more preferable, and 2% by mass or more is further more preferable. From a viewpoint of lowering the active material ratio and increasing discharge capacity of the energy storage device per unit mass and unit volume of the mixture layer, 10% by mass or less is preferable and 5% by mass or less is more preferable.

As for the negative electrode current collector, for example, the one made from aluminum, stainless steel, nickel, copper, titanium, calcined carbon, and copper or stainless steel with its surface treated with carbon, nickel, titanium, or silver, etc., may be used. Further, the surface of these materials can be oxidized or subjected to surface treatment so as to make the surface of the negative electrode current collector rough. Moreover, the negative electrode current collector may be in the form of, for example, a sheet, net, foil, film, punched material, lath, porous material, foamed material, fiber group, nonwoven fabric molding, etc.

With respect to the manufacture method of the negative electrode, the negative electrode can be obtained by uniformly mixing a negative electrode active material (the active material of the present invention), conductive agent, and binder to make a coating material, applying the coating material to the negative electrode current collector, and then drying, and compressing.

As to the method of making the coating material by uniformly mixing the active material (the active material of the present invention), conductive agent, and binder into the solvent, for example, a kneader such as a planetary mixer in which a stirring rod rotates while revolving in the kneading container, a biaxial extrusion type kneader, a planetary-type agitation defoaming device, a bead mill, a high-speed revolving mixer, a powder-suction continuous dissolving and dispersing device, etc., may be used. Also, by dividing the manufacture process by solid content concentration, these devices may be selected accordingly.

In order to uniformly mix the negative active material (the active material of the present invention), conductive agent, and binder to a solvent, optimization should be performed according to the specific surface area of the active material, type of conductive assistant, type of binder, and its combinations. However, when a kneader in which a stirring rod rotates while revolving in a kneading container, a biaxial extrusion type kneader, or a planetary-type agitation defoaming device, etc., is used, it is preferable to gradually reduce the solid content concentration to adjust viscosity of the coating material after dividing the manufacture process by solid content concentration and kneading in a state where the solid content concentration is high. The state of high solid content concentration is preferably 60 to 90% by mass and more preferably 70 to 90% by mass. The shearing force cannot be obtained under 60% by mass, whereas over 90% by mass is unsuitable since the load to the device increases.

There is no particular limitation to the mixing procedure, and a method of mixing the negative active material, conductive agent, biding agent simultaneously in the solvent, a method of adding and mixing the negative active material after mixing the conductive agent and binder in the solvent in advance, and a method of mixing each of the negative active material slurry, conductive agent slurry, and binder solution prepared in advance, etc., can be exemplified. Among these, in order to disperse uniformly, a method of adding and mixing the negative active material after mixing the conductive agent and binder in the solvent in advance and a method of mixing each of the negative active material slurry, conductive agent slurry, and binder solution prepared in advance are preferable.

As the solvent, water and an organic solvent can be used. For the organic solvent, an aprotic organic solvent such as N-methylpyrrolidone, dimethylacetamide, and dimethylformamid may be used singly or in a mixture of two kinds or more can be mentioned, but preferably N-methylpyrrolidone.

When water is used as the solvent, it is preferable to add water in the last manufacture process, which is the viscosity adjustment process, in order to avoid aggregation of the binder. More, when the pH of the coating material becomes high, corrosion of aluminum occurs when aluminum is used for the negative current collector, so that it is preferable to add an acidic compound to lower the pH to the level where corrosion does not occur. For the acidic compound, either inorganic acid or organic acid can be used. As the inorganic acid, phosphoric acid, boric acid, and oxalic acid are preferable, however, oxalic acid is more preferable. As the organic acid, organic carboxylic acid is preferable.

When an organic solvent is used for the solvent, it is preferable to dissolve the binder in advance to the organic solvent before use.

<Positive Electrode>

A positive electrode includes a mixture layer containing a positive electrode active material, a conductive agent, and a binder on single or both faces of a positive electrode current collector.

As the positive electrode active material, a material that can absorb and release, lithium is used. For example, as an active material, lithium metal complex oxide containing cobalt, manganese, or nickel, and olivine type lithium metal phosphate, etc., may be used. These active materials can be used singly or in combination of two or more kinds. Examples of such complex metal oxide are, $LiCoO_2$, $LiMn_2O_4$, $LiNiO_2$, $LiCo_{1-x}Ni_xO_2$ (0.01<x<1), $LiCo_{1/3}Ni_{1/3}Mn_{1/3}O_2$, and $LiNi_{1/2}Mn_{3/2}O_4$, etc. A part of these lithium metal complex oxides can be replaced with another element. For example, the part of cobalt, manganese, or nickel may be replaced with at least one kind of element selected from Sn, Mg, Fe, Ti, Al, Zr, Cr, V, Ga, Zn, Cu, Bi, Mo, and La, etc., or the part of "O" may be replaced with "S" or "F". Also, these complex metal oxides may be coated with a compound containing these other elements. Art example of olivine type lithium metal phosphate is at least one kind selected from the group consisting of $LiFePO_4$, $LiCoPO_4$, $LiNiPO_4$, $LiMnPO_4$, $LiFe_{1-x}M_xPO_4$, etc., (where M is at least one kind selected from the group consisting of Co, Ni, Mn, Cu, Zn, and Cd, and x satisfies $0 \leq x \leq 0.5$).

The conductive agent and binder for the positive electrode are the same as those used for the negative electrode. The positive electrode current collector is, for example, aluminum, stainless steel, nickel, titanium, calcined carbon, and aluminum or stainless steel with its surface treated with carbon, nickel, titanium, or silver, or the like. The surface of these materials can be oxidized or subjected to surface treatment so as to make the surface of the positive electrode current collector rough. Moreover, the current collector may be in the form of, for example, a sheet, net, foil, film, punched material, lath, porous material, foamed material, fiber group, nonwoven fabric molding, etc.

<Non-Aqueous Electrolyte Solution>

The non-aqueous electrolyte solution is made by dissolving electrolyte salt to a nonaqueous solvent. There are no particular restrictions to the non-aqueous electrolyte solution and various types can be used.

As an electrolyte salt, the one that dissolves into non-aqueous solvent is used. For example, an inorganic lithium salt such as $LiPF_6$, $LiBF_4$, $LiPO_2F_2$, $LiN(SO_2F)_2$, and $LiClO_4$, a lithium salt containing a chain fluoroalkyl group such as $LiN(SO_2CF_3)_2$, $LiN(SO_2C_2F_5)_2$, $LiCF_3SO_3$, $LiC(SO_2CF_3)_3$, $LiPF_4(CF_3)_2$, $LiPF_3(CF_3)_3$, $LiPF_3(iso-C_3F_7)_3$, and $LiPF_5(iso-C_3F_7)$, a lithium salt containing a cyclic fluorinated alkylene chain such as $(CF_2)_2 (SO_2)_2 NLi$ and $(CF_2)_3 (SO_2)_2NLi$, a lithium salt that contains oxalate complex as an anion such as lithium bis[oxalate-O,O']borate and lithium difluoro[oxalate-O,O']borate, etc., may be used. Among these, particularly preferable electrolyte salts are $LiPF_6$, $LiBF_4$, $LiPO_2F_2$, and $LiN(SO_2F)_2$, and most preferable electrolyte salt is $LiPF_6$. These electrolyte salts may be used singly or in combination of two or more.

The electrolyte salts are completely dissolved in use and concentration of electrolyte salts is generally 0.3M or more with respect to the nonaqueous solvent, more preferably 0.5M or more, and further preferably 0.7M or more. Further, its upper limit is preferably 2.5M or less, more preferably 2.0M or less, further preferably 1.5M or less.

More, as for the suitable combination of these electrolyte salts, a case, where $LiPF_6$ is contained, and also when at least one kind of lithium salt selected from $LiBF_4$, $LiPO_2F_2$, and $LiN(SO_2F)_2$ is contained to the non-aqueous electrolyte solution is preferable. When the percentage of the lithium salts other than $LiPF_6$ in the nonaqueous solvent is 0.001M or more, effects of improving 50 C charge rate performance of the energy storage device and capacity retention ratio after high-temperature storage are further exhibited, and the percentage of 1.0M or less is preferable since the risk of reducing the effect of improving 50 C charger rate performance and effect of improving capacity retention ratio after high-temperature storage is low. However, 0.01M or more is preferable, 0.03M or more is particularly preferable, and 0.04M or more is most preferable. The upper limit of the percentage is preferably 0.8M or less, more preferably 0.6M or less, and particularly preferably 0.4M or less.

Examples of the nonaqueous solvent include cyclic carbonate, chain carbonate, chain ester, ether, amide, phosphoric ester, sultanate, lactone, nitrile, and S=O bond-containing compound, etc.

The term "chain ester" is used based on the concept including chain carbonate and chain carboxylic acid.

The nonaqueous solvent is general used in a mixture in order to achieve appropriate physical properties. Examples of their combinations are, a combination of cyclic carbonate and chain carbonate, a combination of cyclic carbonate, chain carbonate, and lactone, a combination of cyclic carbonate, chain carbonate, and ether, a combination of cyclic carbonate, chain carbonate, and chain ester, a combination of cyclic carbonate, chain carbonate, and nitrile, a combination of cyclic carbonate, chain carbonate, and S=O bond-containing compound, etc.

As cyclic carbonate, one, two, or more kinds selected from ethylene carbonate (EC), propylene carbonate (PC), 1,2-butylene carbonate, 2,3-butylene carbonate, 4-fluoro-1,3-dioxolane-2-one (FEC), trans- or cis-4,5-difluoro-1,3-dioxolant-2-one (hereinafter, both of them are collectively referred to as "DFEC"), vinylene carbonat (VC), vinyl ethylene carbonate (VEC), and 4-ethynyl-1,3-dioxolane-2-one (EEC) can be exemplified. From a viewpoint of raising the effect of improving 50 C charge rate performance and the effect of improving the capacity retention ratio after high-temperature storage, one, two, or more kinds selected from ethylene carbonate, propylene carbonate, 1,2-butylene carbonate, 2,3-butylene carbonate, 4-fluoro-1,3-dioxolane-2-one, and 4-ethynyl-1,3-dioxolane-2-one (EEC) are suitable. More, one two, or more kinds of cyclic carbonates including an alkylene chain selected from propylene carbonate, 1,2-butylene carbonate, and 4,3-butylene carbonate are more suitable.

The percentage of cyclic carbonate including an alkylene chain is preferably within a range of 55% by volume to 100% by volume and more preferably within a range of 60% by volume to 90% by volume.

As chain ester, one, two or more kinds of asymmetrically chain carbonates selected from methyl ethyl carbonate (MEC), methyl propyl carbonate (MPC), methyl isopropyl carbonate (MIPC), methyl butyl carbonate, and ethyl propyl carbonate; one or two kinds of symmetrically chain carbonates selected from dimethyl carbonate (DMC), diethyl carbonate (DEC), dipropyl carbonate, and dibutyl carbonate; and one or two kinds of chain carboxylic acid esters selected from pivalic acid ester such as pivalic acid methyl, pivalic acid ethyl, and pivalic acid propyl, propionic acid methyl, propionic acid ethyl, propionic acid propyl, methyl acetate, and ethyl acetate (EA).

Among the chain esters, chain ester including a methyl group selected from dimethyl carbonate, methyl ethyl carbonate, methyl propyl carbonate, methyl isopropyl carbonate, methyl butyl carbonate, propionic acid methyl, methyl acetate, and ethyl acetate (EA) is preferable, and chain carbonate including methyl group is particularly preferable.

Further, when chain carbonate is used, using two kinds or more is preferable. Furthermore, including both symmetrically chain carbonate and asymmetrically chain carbonate is more preferable, and including more symmetrically chain carbonate than the content of asymmetrically chain carbonate is further more preferable.

The chain ester content is not particularly limited, however, it is preferable when the content is within a range of 60 to 90% by volume of the total volume of the nonaqueous solvent. When the content is 60% by volume or more, viscosity of the non-aqueous electrolyte solution does not become too high and when the content is 90% by volume or less, the risk of lowering the effect of improvement in 50 C charge rate performance and the effect of improvement in capacity retention ratio after high-temperature storage due to lowering of electric conductivity of the non-aqueous electrolyte solution is small. Accordingly, the above range is preferable.

The percentage of the symmetrically chain carbonate volume in chain carbonate is preferably 51% by volume or more, and more preferably 55% by volume or more. As to the upper limit, 95% by volume or less is preferable, and 85% by volume or less is more preferable. When symmetrically chain carbonate includes dimethyl carbonate, it is particularly preferable. Also, it is more preferable when asymmetrically chain carbonate includes a methyl group, and thus methyl ethyl carbonate particularly preferable. The above, case is further preferable since the effect of improvement in the 50 C charge rate performance and the effect of improvement in the capacity retention ratio after high-temperature storage improve.

From a viewpoint of raising the effect of improvement in 50 C charge rate performance and the effect of improvement in capacity retention ratio after high-temperature storage, a ratio of cyclic carbonate to chain ester, cyclic carbonate: chain ester (a volume ratio), is preferably within a range of 10:90 to 45:55, more preferably 15:85 to 40:60, and particularly preferably 20:80 to 35:65.

<Lithium Battery Structure>

The structure of the lithium battery of the present invention is not particularly limited. For instance, a coin type battery including a positive electrode, negative electrode, and single- or multi-layered separator, and a cylindrical battery and square type battery including a positive electrode, negative electrode, and roll separator, are some examples.

As a separator, an insulative thin film having high ion permeability and with a prescribed mechanical strength is used. Polyethylene, polypropylene, a cellulose paper, a glass fiber paper, polyethylene terephthalate, a polyimide micro porous film are some examples, and a multi-layered film formed by a combination of two or more of these can be also used. Also, surfaces of these separators may be coated with resin such as PVDF, silicon resin, and rubber resin, or with metal oxide particles such as aluminum oxide, silicon dioxide, and magnesium oxide. The pore diameter of the separator should be within the range useful for a battery in general, for example, 0.01 to 10 µm. The thickness of the separator should be within the range of a battery in general, for example, 5 to 300 µm.

EXAMPLES

In the following, the present invention will be specifically described using examples and comparative examples. However, the present invention is not construed as being limited to the following examples, but intended to include various combinations that can be easily analogized from the scope of the invention. Particularly, solvent combinations are not limited to those in the examples. The physical property values and characteristic values of the examples and comparative examples described below are all summarized in Table 1.

[Method of Measuring Physical Properties]
[1. XRD]

As a measurement device, an X-ray diffractometer that utilizes CuKα ray (RINT-TTR-III of Rigaku Corporation) was used. The conditions for the X-ray diffraction measurement were: measurement angle range ($2\theta$) of 10° and 90°, step interval of 0.02°, length of measurement time of 0.25 sec./step, radiation source of CuKα ray, tube bulb voltage of 50 kV, and current of 300 mA.

The main peak intensity of the lithium titanate (peak intensity within the diffraction angle range $2\theta=18.1$ to 18.5°), the main peak intensity of rutile-type titanium dioxide (peak intensity within the diffraction angle range $2\theta 27.2$ to 27.6°), the peak intensity of the anatase-type titanium dioxide (peak intensity within the diffraction angle range $2\theta=24.7$ to $25.7°$), and the main peak intensity of $Li_2TiO_3$ (peak intensity within the diffraction angle range $2\theta=43.5$ to $43.8°$) were measured.

Then, a relative value of the peak intensity when the main peak intensity of lithium titanate is defined to be 100 was calculated for rutile-type titanium dioxide, anatase-type titanium dioxide, and $Li_2TiO_3$.

[2. Crystallite Diameter ($D_X$)]

The crystallite diameter ($D_X$) of the lithium titanate powder of the present invention was determined using the Scherrer equation, the formula (4) below, from the half-peak width of the peak of the (111) plane of lithium titanate obtained under the measurement conditions of measurement angle range ($2\theta$) of $15.8°$ to $21.0°$, step interval of $0.01°$, length of measurement time of 1 sec./step, radiation source of CuKα ray, tube bulb voltage of 50 kV, and current of 300 mA, using the same X-ray diffraction measurement device as the XRD mentioned above. In calculation of the half-peak width, the ray width by the diffractometer optical system needed to be corrected, and a silicon powder was used for the correction.

$$D_X = K \cdot \lambda / (FW(S) \cdot \cos \theta_c) \quad (4)$$

$FW(S)^D = FWHM^D - FW(I)^D$
$FW(I) = f0 + f1 \times (2\theta) + f2 \times (2\theta)^2$
$\theta_c = (t0 + t1 \times (2\theta) + t2 \times (2\theta)^2)/2$
K: Scherrer constant (0.94)
$\lambda$: $CuK\alpha_1$ ray wavelength (1.54059 Å)
FW(S): half-peak width (FWHM) unique to the sample
FW (I): half-peak width (FWHM) unique to the device
D: deconvolution parameter (1.3)
f0=5.108673E-02
f1=1.058424E-04
f2=6.871481E-06
$\theta_c$: correction value for the Bragg angle
t0=−3.000E-03
t1=5.119E-04
t2=−3.599E-06

[3. Particle Size Distribution]

For the particle size distribution measurement of the mixed powder and lithium titanate powder according to the present invention, a laser diffraction/scattering particle size analyzer (Microtrac MT3300EXII of Nikkiso Co., Ltd.) was used. For the preparation of a measurement sample, ethanol was used as a measurement solvent for the case of a mixed powder and ion exchange water was used for the case of lithium titanate powder. When the measurement sample was a powder, approximately 50 mg of the sample was added to 50 ml of the measurement solvent and then 1 cc of 0.2% aqueous solution of sodium hexametaphosphate as a surfactant was added. The obtained slurry for the measurement was treated with an ultrasonic homogenizer. When the measurement sample was a mixed slurry composed of a mixed powder, the same method as used for when the measurement sample was a powder was used except that approximately 50 mg of the sample on a powder basis was added. The subsequent operations were performed in the same method regardless of the measurement sample types. The slurry for the measurement subjected to dispersion treatment was put into a measurement cell and then the slurry concentration was adjusted by adding the measurement solvent. When the slurry transmittance became within the appropriate range, particle size distribution was measured. From the obtained particle size distribution curve, D95 of the mixed powder were calculated.

[4. BET Specific Surface Area ($m^2/g$)]

A BET specific surface area was measured in a one-point method using liquid nitrogen, using the automatic BET specific surface area analyzer (Macsorb HM model-1208, of Mountech Co., Ltd.).

[5. BET Diameter ($D_{BET}$)]

The BET diameter ($D_{BET}$) was determined using the following formula (5) assuming that all particles constituting the powder were spheres having the same diameter. Here, $D_{BET}$ is the BET diameter (μm), $\rho_S$ is the true density (g/cc) of lithium titanate, and S is the BET specific surface area ($m^2/g$).

$$D_{BET} = 6/(\rho_S \times S) \quad (5)$$

[6. Phosphorus Atom (P) Amount in Entire Lithium Titanate Powder (Inductively Coupled Plasma Emission Spectrometric Analysis Method)]

A quantitative analysis was performed for the amount of phosphorus atoms contained in the entire lithium titanate powder using the inductively coupled plasma emission spectrometer (SPS5100, of SII Nano Technology, Inc.). As a measurement sample, a test liquid prepared by hermetically sealing the precisely-weighed sample after adding nitric acid and hydrofluoric acid thereto, irradiating microwave for thermal decomposition, and adding ultrapure water up to a constant volume was used.

[7. Concentration of Titanium Atoms (Ti) and Phosphorus Atoms (P) at Cross-Section of Lithium Titanate Particle (Scanning Transmission Electron Microscope (STEM))]

For a lithium titanate particle that constitutes the lithium titanate powder according to the present invention, across-sectional analysis of the lithium titanate particle was performed using the scanning transmission electron microscope (STEM), and the concentration of titanium atoms and phosphorus atoms at a predetermined position in a lithium titanium particle was measured by energy dispersive X-ray spectroscopy (EDS). The measurement method was as follows.

The lithium titanate particle was bonded to a dummy substrate using epoxy resin, cut, bonded to a reinforcement ring, grinded, dimpled, subjected to Ar-ion milling, and finally subjected to carbon vapor deposition to prepare a thin sample.

The concentration of titanium atoms (Ti) and phosphorus atoms (P) of lithium-titanate particle at a specific position was measured by the energy dispersive X-ray spectroscopy (EDS) as follows. While observing the cross section of the thin sample at an accelerating voltage of 120 kV using JEM-2100 F type field-emission transmission electron microscope (with Cs correction) of JEOL Ltd., after determining an outline of the lithium titanate, particle surface, the average of atomic concentration of the titanium atoms and phosphorus atoms was measured from 10 points positioned on a 5-nm-shift line (a line positioned 5 urn inside from the outline and following a similar path traced by the outline) indicating a line showing positions shifted 5 urn inside from the outline of lithium titanate particle surface, and the average of the titanium atoms and phosphorus atoms was measured from 10 points positioned on a 100-nm-shift line (a line positioned 100 urn inside from the outline and, following a similar path traced by the outline) indicating a line showing positions shifted 100 nm inside from the surface of the lithium titanate particle with the UTW Si (Li) semiconductor detector of JEOL Ltd., provided with the microscope using a beam diameter of 0.2 nm.

[9. Measurement of Total Fine-Pore Volume (Gas Absorption Method)]

For the lithium titanate powder of the present invention, a total fine-pore volume was measured using the gas absorption method. The measurement method was as follows.

For the measurement device, a high-performance automatic gas adsorption amount measurement device, AC1-iQ (manufactured by QUANTACHROME), was used and for the adsorption gas, nitrogen gas was used. As preprocessing, 1 g of lithium titanate powder was measured out and put into a measurement cell, and then deaerated for 15 hours under 200° C. vacuum. The size of the cell was a large and the stem diameter was 6 mmφ. An automatic gas adsorption amount measurement was performed using the constant volume method and the total fine-pore volume was checked.

[10. Analysis of Lithium/Titanate Ratio (Li/Ti Ratio) of Entire Lithium Titanate Powder]

The lithium atom content and titanium, atom content of the lithium titanate powder according to the present invention were each measured by the following method and lithium/titanium ratio (Li/Ti ratio) was calculated.

The lithium atom content was measured in the following method. After heat melting the lithium titanate powder sample using hydrofluoric acid, titanium was removed by adsorption by anion exchange resin and lithium was eluted. After evaporating and drying by adding sulfuric acid to the eluent, ignited and the mass as $Li_2SO_4$ was measured. Then, $Li_2SO_4$ was converted to lithium and analysis value was determined. The impurity elements in $Li_2SO_4$ after the mass measurement was quantitated by ICP-AES and the analysis value of lithium was corrected. The titanium atom content was measured based on quantitative analysis of Ti conformed to JIS K 8703-1992.

Example 1

$Li_2CO_3$ (average particle size of 4.6 μm) and anatase-type $TiO_2$ (average particle size of 0.6 μm) were weighed so as to achieve the atomic ratio of Li to Ti, Li/Ti, of 0.80 and $Li_3PO_4$ was weighed so as to become 0.26% by mass relative to lithium titanate obtained after calcination. Then, ion exchanged water was added so that the solid content concentration became 41% by mass and then stirred to obtained a mixed slurry. The mixed slurry was milled and mixed using a bead mill (type; DYNO-MILL KD-20BC of Willy A. Bachofen AG, agitator material: polyurethane, vessel inner material: zirconia) where the beads were filled into the vessel by 80% by volume and controlling the agitator rotation speed to 13 m/s, slurry feed speed of 55 kg/hr, and vessel inner pressure of 0.02 to 0.03 MPa or less. From the obtained particle size distribution, D95 of the mixed powder after bead mill milling and mixing, that is a mixing powder to be subjected to calcination, was calculated. The result is shown in Table 1.

The obtained slurry was led into the furnace core tube of the rotary-kiln type calcination furnace (furnace core tube length: 4 m, furnace core tube diameter: 30 cm, external heating type) with an adhesion prevention mechanism from the raw material supply side and then dried and calcined. At this time, slope angle for the furnace core tube was 2 degrees from the horizontal direction, the furnace core tube rotation speed was 2.0 rpm, and flow speed of nitrogen injected into the furnace core tube from the calcined material recovery side was 20 lit./min. Temperature of the furnace core tube was 900° C. for the raw material supply side, 900° C. for the central section, and 900° C. for the calcined material recovery side. The material was stayed at heating region for 26 minutes. Then, the calcined material recovered from the calcined material recovery side of the furnace core tube was deagglomerated using a hammer mill (AIIW-5 of Dalton Co., Ltd.) under conditions where screen mesh size was 0.5 mm, number of rotation times was 8,000 rpm, and powder feed speed was 25 kg/hr. The deagglomerated powder was sieved (mesh size of 45 μm) and the powder that passed through the sieve was collected.

For the obtained lithium titanate powder of the spherical secondary particles, measurement of physical properties described in [Method of measuring physical properties] was performed. The results are shown in Table 1.

More, in Table 1, as to the mixing and milling method in the preparation process of the raw material, bead mill mixing adopted in the present example, etc., is indicated as A1, and dry mixing adopted in some of the comparative examples is indicated as A2. Further, also in Table 1, regarding the calcination furnace used in the calcination process, rotary kiln furnace used in the present example, etc., is indicated as B1 and a muffle furnace used in some of the comparative examples described in the following is indicated as B2.

<Preparation of Electrolytic Solution>

The electrolytic solution for use in a battery for evaluation of characteristics was prepared as follows. An electrolytic solution was prepared by first preparing a nonaqueous solvent having a volume ratio of ethylene carbonate (EC): propylene carbonate (PC):methyl ethyl carbonate (MEC): dimethyl carbonate (DMC)+10:20:20:50, and $LiPF_6$ and $LiPO_2F_2$ were dissolved thereto as the electrolyte salt so as to become the concentration of 1M of $LiPF_6$ and 0.05M of $LiPO_2F_2$ respectively.

<Manufacture of an Evaluation Electrode Sheet>

A coating material was prepared as follows so as to achieve the percentage where lithium titanate powder of Example 1 is 90% by mass, acetylene black (conductive anent) is 5% by mass, and polyvinylidene fluoride (binder) is 5% by mass. After mixing polyvinylidene fluoride dissolved to 1-methyl 2-pyrrolidone solvent in advance, acetylene black, and 1-methyl 2-pyrrolidone solvent using a planetary-type agitation defoaming device, lithium titanate powder was added, a solid content concentration was adjusted to become 64% by mass, and then mixed using the planetary-type agitation defoaming device. Then, the 1-methyl 2-pyrrolidone solvent was added to make the total solid content concentration to 56% by mass and mixed using the planetary-type agitation defoaming device to prepare coating material. The obtained coating material was applied onto an aluminum foil and then dried to obtain an evaluation electrode single-side sheet. More, the coating material was also applied to the other side of the evaluation electrode single-side sheet and dried to obtain an evaluation electrode double-side sheet.

<Manufacture of a Counter Electrode Sheet>

In the same manufacture method described in <Manufacture of an evaluation electrode sheet> above, coating material containing lithium cobalt oxide powder by 90% by mass as an active material, acetylene black (conductive agent) by 5% by mass, and polyvinylidene fluoride (binder) by 5% by mass was prepared. Then, the coating material was applied onto an aluminum foil and after drying, the coating material was also applied to the other face and dried to obtain a counter electrode double-side sheet.

<Manufacture of a Coin Battery>

The evaluation electrode single-side sheet was stamped out to a disk shape having a diameter of 14 mm, pressed with a pressure of 7 t/cm², and dried under a vacuum for 5 hours at 120° C. to manufacture an evaluating electrode. The obtained evaluating electrode and metal lithium (formed into a disk having a thickness of 0.5 mm and a diameter of 16 mm) were disposed facing to each other thorough a glass filter (a double layer of GA-100 and GF/C, manufactured by Whatman) interposed therebetween and prepared for use in a battery for evaluation. Then, the prepared non-aqueous electrolytic solutions were added respectively and then sealed to fabricate 2030-type coin batteries.

<Manufacture of a Laminated Battery>

The evaluation electrode double-side sheet, was pressed with a pressure of 2 t/cm$^2$, and then stamped out to obtain a negative electrode where the mixture layer including a lead wire connection part is 4.2 cm in the vertical direction and 5.2 cm in the horizontal direction. The counter electrode double-side sheet was pressed with a pressure of 2 t/cm$^2$ and then stamped out to obtain positive electrode where the mixture layer including a lead wire connection part is 4 cm in the vertical direction and 5 cm in the horizontal direction. The manufactured negative electrode and positive electrode were faced to each other through a separator (UP3085, manufactured by Ube Industries, Ltd.,) interposed therebetween, layered, connected the lead wires of the aluminum foil for both the negative and positive electrodes, added the non-aqueous electrolyte solution, and vacuum sealed with aluminum laminate to obtain a laminate-type battery for evaluation of capacity retention ratio after storage at 60° C. At this time, the capacity of the battery was 200 mAh and the ratio of the negative electrode and positive electrode capacities (the ratio of negative electrode capacity/positive electrode capacity) was 1.1.

Using the batteries, the initial discharge capacity, the 50 C charge rate performance, and the capacity retention ratio after storage at 60° C. were evaluated.

<Initial Charge-Discharge Capacity (Room Temperature)>

When the direction where Li is absorbed to the evaluating electrode is considered as charging, the coin-type battery prepared in the method explained in <Manufacture of a coin battery> above was charged up to 1V with a current density of 0.2 mA/cm$^2$ in a constant temperature bath of 25° C., and then subjected to constant-current charge and constant-voltage where the coin-type battery was charged at 1V until the charge current became a current density of 0.05 mA/cm$^2$. Following this, the coin-type battery was subjected to constant current discharge where it was discharged up to 2V at a current density of 0.2 mA/cm$^2$. The above charge and discharge cycle was repeated for 3 times and the discharge capacity in the third cycle was used as the initial discharge capacity. The results are shown in Table 1.

<Evaluation of 50 C Charge Rate Performance (Room Temperature)>

For the coin battery to which the initial discharge capacity was measured, constant current charge where the battery is charged up to 1V with a current of 50 C was performed in a 25° C. constant temperature bath. Then, constant current discharge where the battery is discharged up to 2V with a current density of 0.2 mA/cm$^2$ was performed and the charge capacity at 50 C current was measured. Then, a value determined by dividing the charge capacity at 50 C current by the initial discharge capacity described above was set as a 50 C charge rate performance value. The results are shown in Table 1. Here, 50 C means the current value where the initial discharge capacity described above can be charged in 1/50 hour.

<Evaluation of Capacity Retention Ratio After Storage at 60° C.>

In the 25° C. constant temperature bath, the manufactured laminated battery was charged up to 2.75V by 40 mA, subjected to constant-current and constant-voltage charge at 2.75V until the charge current became 10 mA, and then subjected to constant current discharge with 40 mA current up to 1.4V. This cycle was repeated for three times. Next, in the 25° C. constant temperature bath, constant-current and constant-voltage charge where the battery is charged up to 2.75V at 40 mA and then charged at 2.75V until the charge current reaches 10 mA was performed, the charge capacity before storage was measured, and the battery was stored for seven days in the 60° C. constant temperature bath in a charged state. After the storage, constant current discharge was performed at 40 mA current up to 1.4V in the 25° C. constant temperature bath, the discharge capacity after storage was measured, and the capacity retention ratio after storage at 60° C. was determined by dividing by the charge capacity before storage. The results are shown in Table 1.

Examples 2 to 15

The lithium titanate powder according to Example 2 to Example 15 was prepared in the same method described in Example 1 and evaluation of physical properties were performed in the same method described in Example 1 except that for the Li$_3$PO$_4$ addition amount to the raw material, the amount shown in Table 1 was used, and the mixed powder with the 195 shown in Table 1 was obtained by adjusting processing conditions of bead mill milling and mixing during the material preparation process, and calcination was performed to the obtained mixed powder while using the maximum temperature in the calcination process and retention time of the maximum temperature shown in Table 1. More, a coin-type battery and laminate-type battery to which the lithium titanate powder was applied to the electrode material were prepared in the same method described in Example 1, and evaluation of battery performance was performed in the same method as in Example 1. The obtained evaluation of physical properties and evaluation of battery performance of the lithium titanate powder according to Examples 2 to 15 are shown in Table 1. Also, the result of the measurement performed to the lithium titanate particle constituting the lithium titnate powder in Example 3 in [7. Concentration of titanium atoms (Ti) and phosphorus atoms (P) at lithium titanate particle cross section (scanning transmission electron microscope (STEM))] in [Method of measuring physical properties] as described above are shown in the FIGURE. The average of atomic concentration of titanium Ati, which is the average of the results obtained from 10 points ("A" in the FIGURE is one these points) positioned on a 5-run-shift line (a line positioned 5 nm inside from the outline and following a similar path traced by the outline) indicating a line showing positions shifted 5 nm inside from the outline of lithium titanate particle surface was 26.0 atm % and the average of atomic concentration of phosphorus Ap was 0.4 atm %. The average of atomic concentration of titanium Bti which is the average of the results obtained from 10 points ("B" in the FIGURE is one of these points) positioned on a 100-nm-shift line (a line positioned 100 nm inside from the outline and following a similar path traced by the outline) indicating a line showing positions shifted 100 nm inside from the surface of the lithium titanate particle was 36.1 atm % and average atomic concentration of phosphorus Bp was 0.5 atm %. Also, (Ap/Ati)/(Bp/Bti) was 1.1. Additionally, for Example 1, Example 2, Example 4 to Example 20 other than Example 3, measurement in [7. Concentration of titanium atoms (Ti) and phosphorus atoms (P) at lithium titanate particle cross section (scanning transmission electron microscope

Example 16

The lithium titanate powder was obtained in the same method as in Example 1 except that for the $Li_3PO_4$ addition amount to the raw material, the amount shown in Table 1 was used, and the mixed powder with the D95 shown in Table 1 was obtained by adjusting processing conditions of bead mill milling and mixing during the raw material preparation process, and calcination was performed to the obtained mixed powder while using the maximum temperature in the calcination process and retention time of the maximum temperature shown in Table 1. Then, to the obtained lithium titanate powder, ball mill milling with 1 mmφ zirconia ball was performed for 6 hours and the lithium titanate powder according to Example 16 was obtained. To the obtained lithium titanate powder according to Example 16, evaluation of physical properties was performed in the same method as in Example 1. Also, a coin-type battery and laminate-type battery to which the lithium titanate powder was applied to the electrode material were prepared in the same method as in Example 1 and their battery performance was evaluated in the same method as in Example 1. The obtained evaluation of physical properties and evaluation of battery performance for the lithium titanate powder according to Example 16 are shown in Table 1.

Example 17

The lithium titanate powder was obtained in the same method as in Example 1 except that for the $Li_3PO_4$ addition amount to the raw material, the amount shown in Table 1 was used, and the mixed powder with the D95 shown in Table 1 was obtained by adjusting processing conditions of bead mill milling and mixing during the raw material preparation process, and calcination was performed to the obtained mixed powder while using the maximum temperature in the calcination process and retention time of the maximum temperature shown in Table 1. Then, to the obtained lithium titanate powder, ball mill milling with 1 mmφ zirconia ball was performed for 24 hours and the lithium titanate powder according to Example 17 was obtained. To the obtained lithium titanate powder according to Example 17, evaluation of physical properties was performed in the same method as in Example 1. Also, a coin-type battery and laminate-type battery to which the lithium titanate powder was applied to the electrode material were prepared in the same method as in Example 1 and their evaluation of battery performance was performed in the same method as in Example 1. The obtained evaluation of physical properties and evaluation of battery performance for the lithium titanate powder according to Example 17 are shown in Table 1.

Example 18

The lithium titanate powder according to Example 18 was obtained in the same method as in Example 1 except that for the $Li_3PO_4$ addition amount to the raw material, the amount shown in Table 1 was used, and the mixed powder with the D95 shown in Table 1 was obtained by adjusting processing conditions of bead mill milling and mixing during the raw material preparation process, and calcination was performed to the obtained mixed powder while setting the heating temperature of the rotary-kiln type calcination furnace (the maximum temperature in the calcination process) to 880° C. Then, evaluation of physical properties and evaluation of battery performance was performed. The results are shown in Table 1.

Example 19

The lithium titanate powder was synthesized in the same method as in Example 18 except that for the $Li_3PO_4$ addition amount to the raw material, the amount shown in Table 1 was used, and the mixed powder with the D95 shown in Table 1 was obtained by adjusting processing conditions of bead mill milling and mixing during the raw material preparation process. Then, evaluation of physical properties and evaluation of battery performance was performed. The results are shown in Table 1.

Example 20

The electrolytic solution used in a battery for evaluation of battery performance of lithium titanate in Example 8 was prepared and evaluation of battery performance was performed. A nonaqueous solvent was prepared so as to make a volume ratio "ethylene carbonate (EC):propylene carbonate (PC):methyl ethyl carbonate (MEC):dimethyl carbonate (DMC)=10:20:20:50" and to the nonaqueous solvent, $LiPF_6$ was dissolved as the electrolyte salt to make the concentration 1M to prepare the electrolytic solution.

Comparative Example 1

$Li_2CO_3$ (average particle size of 4.6 μm) and anatase-type $TiO_2$ (average particle size of 0.6 μm) were weighed so as to achieve Li/Ti, atomic ratio of Li to Ti, of 0.80 and also weighed to make $P_2O_5$ 0.07% by mass relative to lithium titanate obtained after calcination, and mixed for 30 minutes with a Henschel-type mixer. In Table 1, D95 calculated from the obtained particle size distribution of the mixed powder is indicated. The D95 of the mixed powder in this comparative example was 8.00 μm. The obtained mixed powder was put into a saggar made of high-purity alumina and calcined for 3 hours at 800° C. in air atmosphere using a muffle furnace. The length of time stayed within 700 to 800° C. during temperature raising was 30 minutes. Then, the calcined powder was recovered and sieved (mesh size of 45 μm) after deagglomeration in the same method as used in Example 1, and the powder that passed through the sieve was collected. For the obtained lithium titanate powder for Comparative Example 1, evaluation of physical properties and evaluation of battery performance were performed. The results are shown in Table 1.

Comparative Examples 2 and 3

The lithium titanate powder according to Comparative Example 2 and Comparative Example 3 was prepared in the same method as in Comparative Example 1 except that for the $P_2O_5$ addition amount to the raw material, the amount shown in Table 1 was used. To the obtained lithium titanate powder according to Comparative Example 2 and Comparative Example 3, evaluation of physical properties was performed in the same method as in Example 1. Also, a coin-type battery and laminate-type battery to which the lithium titanate powder was applied to the electrode material were prepared in the same method as in Example 1 and their evaluation of battery performance was performed in the same method as in Example 1. The obtained evaluation of physical properties and evaluation of battery performance for the lithium titanate powder according to Comparative Examples 2 and 3 are shown in Table 1.

Comparative Example 4

The lithium titanate powder according to Comparative Example 4 was prepared in the same method described in Comparative Example 1 except that for the $P_2O_5$ addition amount to the raw material and retention time of the maximum temperature during calcination process, those shown in Table 1 were used. To the obtained lithium titanate powder according to Comparative Example 4, evaluation of physical properties was performed in the same method as in Example 1. The obtained results from evaluation of physical properties and evaluation of battery performance of the lithium titanate powder according Comparative Example 4 are shown in Table 1.

Comparative Example 5

The lithium titanate powder according to Comparative Example 5 prepared in the same method described in Comparative Example 1 except that for the type and addition amount of P additive to the raw material, and retention time of the maximum temperature in the calcination process, those shown in Table 1 were used. To the obtained lithium titanate powder according to Comparative Example 5, evaluation of physical properties was performed in the same method as in Example 1. Also, a coin-type battery and laminate-type battery to which the lithium titanate powder was applied to the electrode material were prepared in the same method as in Example 1 and their evaluation of battery performance was performed in the same method as in Example 1. The obtained evaluation of physical properties and evaluation of battery performance for the lithium titanate powder according to Comparative Example 5 are shown in Table 1.

Comparative Examples 6 to 11

The lithium titanate powder according to Comparative Example 6 to Comparative Example 11 was prepared in the same method as in Example 1 except that for the $Li_3PO_4$ addition amount to the raw material, the amount shown in Table 1 was used, and the mixed powder with the D95 shown in Table 1 was obtained by adjusting processing conditions of bead mill milling and mixing during the raw material preparation process, and calcination was performed to the obtained mixed powder while using the maximum temperature in the calcination process and retention time of the maximum temperature shown in Table 1. Then in the same method as in Example 1, evaluation of physical properties was performed. Also, a coin-type battery and laminate-type battery to which the lithium titanate powder was applied to the electrode material were prepared in the same method as in Example 1 and their evaluation of battery performance was performed in the same method as in Example 1. The obtained evaluation of physical properties and evaluation of battery performance for the lithium titanate powder according to Comparative Examples 6 to 11 are shown in Table 1.

Comparative Example 12

For the lithium titanate powder obtained in the same method as in Example 1 except that the mixed powder with the D95 shown in Table 1 was prepared without adding P additive to the raw material but by adjusting processing conditions of bead mill milling and mixing during the raw material preparation process, and to the mixed powder, calcination was performed while using the maximum temperature in the calcination process and retention time of the maximum temperature shown in Table 1, ball mill milling using 1 mmφ zirconia ball was performed for 6 hours and the lithium titanate powder according to Comparative Example 12 was prepared. To the obtained lithium titanate powder according to Comparative Example 12, evaluation of physical properties was performed in the same method as in Example 1. Also, a coin-type battery and laminate-type battery to which the lithium titanate powder was applied to the electrode material were prepared in the same method as in Example 1 and their battery performance was evaluated in the same method as in Example 1. The obtained evaluation of physical properties and evaluation of battery performance of the lithium titanate powder according to Comparative Example 12 are shown in Table 1.

Comparative Examples 13 to 16

The lithium titanate powder according to Comparative Examples 13 to 16 was prepared in the same method as in Comparative Example 12 except that the mixed powder with the D95 shown in Table 1 was obtained by adding $Li_3PO_4$ as P additive to the raw material for the amount shown in Table 1 and by adjusting processing conditions for bead mill milling and mixing in the raw material preparation process. Then, evaluation of physical properties was performed in the same method as in Example 1. Further, a coin-type battery and laminate-type battery to which the lithium titanate powder was applied to the electrode material were prepared in the same method as in Example 1 and their evaluation of battery performance was performed in the same method as in Example 1. The obtained evaluation of physical properties and evaluation of battery performance for the lithium titanate powder according to Comparative Examples 13 to 16 are shown in Table 1.

TABLE 1

| | Manufacture Process | | | | | | | | Lithium Titanate Powder | | |
|---|---|---|---|---|---|---|---|---|---|---|---|
| | Raw Material Preparation Process | | | | Calcination Process | | | | | XRD Peak Intensity | |
| | Type of P Additive | Amount of P Additive (mass %) | Mixing and Milling Method | D95 of Mixed Powder (μm) | Calcination Furnace | Maximum Temp. | Max. Temp. Retention Time | Post-processing Process | Li/Ti Ratio | $Li_4Ti_5O_{12}$ | Anatase-type Titanium Dioxide |
| Example 1 | $Li_3PO_4$ | 0.26 | A1 | 0.75 | B1 | 900° C. | 26 min. | Deagglomeration | 0.81 | 100.0 | 0.0 |
| Example 2 | | 1.20 | | 0.72 | | | | | 0.83 | | 0.0 |

TABLE 1-continued

|  |  |  |  |  |  |  |  |  |  |
|---|---|---|---|---|---|---|---|---|---|
| Example 3 |  | 1.72 |  | 0.71 |  |  |  | 0.84 | 0.0 |
| Example 4 |  | 2.77 |  | 0.73 |  |  |  | 0.87 | 0.0 |
| Example 5 |  | 3.59 |  | 0.72 |  |  |  | 0.88 | 0.0 |
| Example 6 |  | 0.56 |  | 0.54 |  | 850° C. |  | 0.81 | 0.0 |
| Example 7 |  | 1.12 |  | 0.56 |  |  |  | 0.83 | 0.0 |
| Example 8 |  | 1.76 |  | 0.51 |  |  |  | 0.84 | 0.0 |
| Example 9 |  | 2.69 |  | 0.53 |  |  |  | 0.86 | 0.0 |
| Example 10 |  | 3.44 |  | 0.55 |  |  |  | 0.88 | 0.0 |
| Example 11 |  | 0.45 |  | 0.36 |  | 800° C. | 7 min. | 0.81 | 0.0 |
| Example 12 |  | 1.12 |  | 0.35 |  |  |  | 0.83 | 0.0 |
| Example 13 |  | 1.72 |  | 0.34 |  |  |  | 0.84 | 0.0 |
| Example 14 |  | 2.80 |  | 0.38 |  |  |  | 0.87 | 0.0 |
| Example 15 |  | 3.51 |  | 0.36 |  |  |  | 0.88 | 0.0 |
| Example 16 |  | 1.68 |  | 0.75 |  | 900° C. | 26 min. | 6 hr. ball mill milling | 0.84 | 0.0 |
| Example 17 |  | 1.61 |  | 0.75 |  |  |  | ball mill milling | 0.84 | 0.0 |
| Example 18 |  | 1.72 |  | 0.65 |  | 880° C. |  | Deagglom-eration | 0.84 | 0.0 |
| Example 19 |  | 2.77 |  | 0.65 |  | 880° C. |  |  | 0.87 | 0.0 |
| Example 20 |  | 1.76 |  | 0.51 |  | 850° C. | 26 min. |  | 0.84 | 0.0 |
| Comparative Example 1 | P$_2$O$_5$ | 0.07 | A2 | 8.00 | B2 | 800° C. | 3 hr. |  | 0.80 | 0.0 |
| Comparative Example 2 |  | 0.23 |  | 9.10 |  |  |  | 0.80 | 0.0 |
| Comparative Example 3 |  | 0.69 |  | 8.50 |  |  |  | 0.80 | 0.0 |
| Comparative Example 4 |  | 0.99 |  | 9.10 |  |  | 6 hr. |  | 0.80 | 0.0 |
| Comparative Example 5 | NH$_4$H$_2$PO$_4$ | 2.90 |  | 8.15 |  |  | 10 hr. |  | 0.80 | 0.0 |
| Comparative Example 6 | Li$_3$PO$_4$ | 0.04 | A1 | 0.75 | B1 | 900° C. | 26 min. |  | 0.80 | 0.0 |
| Comparative Example 7 |  | 4.15 |  | 0.74 |  |  |  | 0.90 | 0.0 |
| Comparative Example 8 |  | 0.04 |  | 0.55 |  | 850° C. |  |  | 0.80 | 0.0 |
| Comparative Example 9 |  | 4.19 |  | 0.56 |  |  |  | 0.90 | 0.0 |
| Comparative Example 10 |  | 0.04 |  | 0.38 |  | 800° C. | 7 min. |  | 0.80 | 0.0 |
| Comparative Example 11 |  | 4.04 |  | 0.36 |  |  |  | 0.90 | 0.0 |
| Comparative Example 12 |  | 0.00 |  | 0.32 |  | 780° C. | 13 min. | 6 hr. ball mill milling | 0.80 | 0.0 |
| Comparative Example 13 |  | 0.37 |  | 0.31 |  |  |  | 0.81 | 0.0 |
| Comparative Example 14 |  | 1.16 |  | 0.31 |  |  |  | 0.83 | 0.0 |
| Comparative Example 15 |  | 1.64 |  | 0.32 |  |  |  | 0.84 | 0.0 |
| Comparative Example 16 |  | 2.92 |  | 0.30 |  |  |  | 0.87 | 0.0 |

|  | Lithium Titanate Powder | | | | | | | | Battery Performance | | |
|---|---|---|---|---|---|---|---|---|---|---|---|
|  | XRD Peak Intensity | | Total Fine-pore Volume (ml/g) | P Content (mass %) | BET Specific Surface Area (m$^2$/g) | $D_{BET}$ ($\mu$m) | $D_X$ (nm) | $D_{BET}/D_X$ ($\mu$m/$\mu$m) | Initial Discharge Capacity (mAh/g) | 50 C Charge Rate Performance | Capacity Retention Ratio After at 60° C. Storage |
|  | Rutile-type Titanium Dioxide | Li$_2$TiO$_3$ | | | | | | | | | |
| Example 1 | 0.7 | 0.0 | 0.031 | 0.07 | 5.8 | 0.300 | 200 | 1.50 | 170 | 42% | 67% |
| Example 2 | 0.3 | 0.0 | 0.037 | 0.32 | 6.7 | 0.260 | 241 | 1.08 | 168 | 43% | 77% |
| Example 3 | 0.5 | 0.0 | 0.034 | 0.46 | 6.2 | 0.281 | 220 | 1.28 | 167 | 41% | 85% |
| Example 4 | 0.0 | 0.0 | 0.036 | 0.74 | 6.8 | 0.256 | 174 | 1.47 | 163 | 43% | 89% |
| Example 5 | 0.7 | 0.0 | 0.043 | 0.96 | 6.0 | 0.290 | 168 | 1.73 | 159 | 42% | 92% |
| Example 6 | 0.2 | 0.0 | 0.247 | 0.15 | 27.1 | 0.064 | 50 | 1.28 | 171 | 71% | 61% |
| Example 7 | 0.0 | 0.0 | 0.231 | 0.30 | 23.6 | 0.074 | 57 | 1.29 | 168 | 73% | 76% |
| Example 8 | 0.4 | 0.0 | 0.238 | 0.47 | 29.4 | 0.059 | 51 | 1.16 | 167 | 74% | 84% |
| Example 9 | 0.5 | 0.0 | 0.239 | 0.72 | 27.0 | 0.064 | 47 | 1.37 | 164 | 71% | 89% |
| Example 10 | 0.2 | 0.0 | 0.242 | 0.92 | 24.9 | 0.070 | 46 | 1.52 | 157 | 70% | 92% |
| Example 11 | 0.2 | 0.0 | 0.425 | 0.12 | 42.3 | 0.041 | 30 | 1.37 | 172 | 80% | 57% |
| Example 12 | 0.5 | 0.0 | 0.433 | 0.30 | 44.0 | 0.040 | 35 | 1.13 | 169 | 83% | 71% |
| Example 13 | 0.6 | 0.0 | 0.428 | 0.46 | 46.1 | 0.038 | 32 | 1.18 | 167 | 80% | 78% |
| Example 14 | 0.2 | 0.0 | 0.417 | 0.75 | 39.1 | 0.044 | 37 | 1.20 | 163 | 79% | 82% |
| Example 15 | 0.1 | 0.0 | 0.427 | 0.94 | 45.0 | 0.039 | 37 | 1.04 | 156 | 84% | 86% |
| Example 16 | 0.5 | 0.0 | 0.053 | 0.45 | 8.0 | 0.217 | 86 | 2.53 | 157 | 39% | 87% |

TABLE 1-continued

| | | | | | | | | | | | |
|---|---|---|---|---|---|---|---|---|---|---|---|
| Example 17 | 0.3 | 0.0 | 0.060 | 0.43 | 9.0 | 0.193 | 61 | 3.17 | 155 | 37% | 84% |
| Example 18 | 0.1 | 0.0 | 0.122 | 0.46 | 15.8 | 0.110 | 86 | 1.28 | 168 | 62% | 76% |
| Example 19 | 0.2 | 0.0 | 0.121 | 0.74 | 16.3 | 0.107 | 81 | 1.32 | 167 | 63% | 89% |
| Example 20 | 0.4 | 0.0 | 0.238 | 0.47 | 29.4 | 0.059 | 51 | 1.16 | 167 | 71% | 80% |
| Comparative Example 1 | 6.0 | 6.0 | 0.010 | 0.03 | 2.0 | 0.870 | 263 | 3.31 | 157 | 13% | 53% |
| Comparative Example 2 | 5.0 | 4.0 | 0.011 | 0.10 | 2.1 | 0.828 | 244 | 3.39 | 156 | 14% | 53% |
| Comparative Example 3 | 3.0 | 7.0 | 0.012 | 0.3 | 2.2 | 0.791 | 247 | 3.20 | 157 | 13% | 54% |
| Comparative Example 4 | 5.0 | 5.6 | 0.008 | 0.43 | 1.7 | 1.023 | 275 | 3.72 | 155 | 13% | 54% |
| Comparative Example 5 | 4.8 | 5.4 | 0.007 | 0.78 | 1.3 | 1.338 | 345 | 3.88 | 154 | 10% | 55% |
| Comparative Example 6 | 0.3 | 0.0 | 0.031 | 0.01 | 5.7 | 0.305 | 254 | 1.20 | 165 | 41% | 53% |
| Comparative Example 7 | 0.6 | 0.0 | 0.035 | 1.11 | 6.0 | 0.290 | 246 | 1.18 | 142 | 42% | 94% |
| Comparative Example 8 | 0.2 | 0.0 | 0.238 | 0.01 | 25.5 | 0.068 | 48 | 1.42 | 166 | 70% | 47% |
| Comparative Example 9 | 0.4 | 0.0 | 0.220 | 1.12 | 26.1 | 0.067 | 49 | 1.36 | 143 | 69% | 93% |
| Comparative Example 10 | 0.6 | 0.0 | 0.466 | 0.01 | 47.0 | 0.037 | 31 | 1.19 | 165 | 80% | 40% |
| Comparative Example 11 | 0.7 | 0.0 | 0.472 | 1.08 | 43.0 | 0.040 | 28 | 1.44 | 142 | 79% | 87% |
| Comparative Example 12 | 2.7 | 1.0 | 0.556 | 0.00 | 58.1 | 0.030 | 14 | 2.14 | 158 | 88% | 35% |
| Comparative Example 13 | 2.0 | 1.4 | 0.564 | 0.10 | 57.0 | 0.031 | 14 | 2.18 | 157 | 87% | 36% |
| Comparative Example 14 | 2.2 | 1.3 | 0.584 | 0.31 | 62.3 | 0.028 | 13 | 2.15 | 157 | 88% | 38% |
| Comparative Example 15 | 1.9 | 1.6 | 0.587 | 0.44 | 61.0 | 0.029 | 11 | 2.59 | 158 | 88% | 38% |
| Comparative Example 16 | 2.2 | 1.3 | 0.591 | 0.78 | 60.4 | 0.029 | 12 | 2.40 | 156 | 87% | 39% |

Additionally, in Table 1, the mixing and milling method "A1" indicates that bead mill milling and mixing was performed in the raw material preparation process, and the mixing and milling method "A2" indicates that mixing and milling was performed using a Henschel-type mixer. Further, in Table 1, the calcination furnace "B1" indicates that the calcination was performed using a rotary-kiln type calcination furnace and the calcination furnace "B2" indicates that calcination was performed using a muffle furnace.

As can be seen from the above examples, in the lithium titanate powder where the main component is $Li_4Ti_5O_{12}$ and the specific surface area is 5 to 50 m²/g, only when the lithium titanate powder according to the present invention where the total fine-pore volume is 0.03 to 0.5 ml/g and phosphorus atoms are contained by 0.03 to 1% by mass is applied to the energy storage device as the electrode material, a large initial charge-discharge capacity and a large charge capacity even at a rate as high as 50 C can be provided, and a storage capacity retention ratio can be maintained high even after storage at 60° C.

What is claimed is:

1. A lithium titanate powder, comprising:
$Li_4Ti_5O_{12}$; and
a phosphorus atom in an amount of from 0.03 to 1% by mass, based on the mass of the lithium titanate powder, wherein:
the lithium titanate powder has a specific surface area of from 5 to 50 m²/g; and
a total pore volume of the lithium titanate powder is from 0.03 to 0.5 ml/g,
wherein in a cross-sectional analysis of a lithium titanate particle that constitutes the lithium titanate powder using a scanning transmission electron microscope, Ati (atm %), Ap (atm %), Bti (atm %), and Bp (atm %) satisfy the following formula (1):

$$0.5 \leq (Ap/Ati)/(Bp/Bti) \leq 2 \quad (1),$$

wherein Ati (atm %) is an average atomic concentration of titanium atom of 10 points measured value of atomic concentration of titanium atom at 5-nm-shift line which is a line positioned 5 nm inside from an outline of a surface of the lithium titanate particle, Ap (atm %) is an average atomic concentration of phosphorus atom of 10 points measured value of atomic concentration of phosphorus atom at the 5-nm-shift line, Bti (atm %) is the average atomic concentration of titanium atom of 10 points measured value of atomic concentration of titanium atom at 100-nm-shift line which is a line positioned 100 nm inside from the outline of the lithium titanate particle surface, and Bp (atm %) is an average atomic concentration of phosphorus atom of 10 points measured value of atomic concentration of phosphorus atom at the 100-nm-shift.

2. The lithium titanate powder according to claim 1, wherein the amount of the phosphorus atom is from 0.03 to 0.8% by mass, based on the mass of the lithium titanate powder.

3. The lithium titanate powder according to claim 1, wherein the amount of the phosphorus atom is from 0.25 to 0.8% by mass, based on the mass of the lithium titanate powder.

4. The lithium titanate powder according to claim 1, wherein a Li/Ti atomic ratio of Li to Ti is from 0.80 to 0.89.

5. The lithium titanate powder according to claim 1, wherein when a volume surface diameter calculated from a specific surface area determined by BET method is represented as $D_{BET}$, and when a crystallite diameter calculated from a half-peak width of a peak for (111) plane of $Li_4Ti_5O_{12}$ by Scherrer equation is represented as $D_X$, $D_{BET}/D_X$ (μm/μm), a ratio of $D_{BET}$ to $D_X$, is 3 or less.

6. The lithium titanate powder according to claim 5, wherein $D_{BET}/D_X$ (μm/pm) is 2 or less.

7. The lithium titanate powder according to claim 5, wherein a Li/Ti atomic ratio of Li to Ti is from 0.80 to 0.89.

8. An active material comprising the lithium titanate powder according to claim 1.

9. A lithium-ion secondary battery comprising the active material according to claim 8.

10. A hybrid capacitor comprising the active material according to claim 8.

11. An electrode sheet for energy storage device comprising the active material according to claim 8.

12. An energy storage device comprising the electrode sheet according to claim 11.

13. The energy storage device according to claim 12, comprising a non-aqueous electrolyte solution, wherein an electrolyte salt comprising at least one lithium salt selected from the group consisting of $LiPF_6$, $LiBF_4$, $LiPO_2F_2$, and $LiN(SO_2F)_2$ is dissolved to a nonaqueous solvent comprising at least one cyclic carbonate selected from the group consisting of ethylene carbonate, propylene carbonate, 1,2-butylene carbonate, 2,3-butylene carbonate, 4-fluoro-1,3-dioxolane-2-one, and 4-ethynyl-1,3-dioxolane-2-one.

14. The energy storage device according to claim 13, wherein the non-aqueous electrolyte solution has a concentration of all electrolyte salts of from 0.7M to 2.0M, comprises at least $LiPF_6$ as the electrolyte salt, and further comprises from 0.01M to 0.4M of at least one lithium salt selected from the group consisting of $LiBF_4$, $LiPO_2F$, and $LiN(SO_2F)_2$.

15. The energy storage device according to claim 13, wherein the nonaqueous solvent further comprises at least one symmetrically chain carbonate selected from the group consisting of dimethyl carbonate, diethyl carbonate, dipropyl carbonate, and dibutyl carbonate, and at least one asymmetrically chain carbonate selected from the group consisting of methyl ethyl carbonate, methyl propyl carbonate, methyl isopropyl carbonate, methyl butyl carbonate, and ethyl propyl carbonate.

16. The energy storage device according to claim 13, wherein the non-aqueous electrolyte solution comprises at least $LiPF_6$ as the electrolyte salt, and further comprises from 0.01M to 0.4M of at least $LiPO_2F_2$.

* * * * *